United States Patent
Lyman et al.

(10) Patent No.: US 11,049,343 B2
(45) Date of Patent: Jun. 29, 2021

(54) TECHNIQUES FOR SECURING A DROPSPOT

(71) Applicant: Vivint, Inc., Provo, UT (US)

(72) Inventors: Jefferson Huhta Lyman, Alpine, UT (US); Clint Huson Gordon-Carroll, Highland, UT (US); Janelle Kim Seegmiller, South Jordan, UT (US)

(73) Assignee: Vivint, Inc., Provo, UT (US)

( * ) Notice: Subject to any disclaimer, the term of this patent is extended or adjusted under 35 U.S.C. 154(b) by 569 days.

(21) Appl. No.: 15/885,422

(22) Filed: Jan. 31, 2018

(65) Prior Publication Data
US 2018/0158265 A1    Jun. 7, 2018

Related U.S. Application Data

(63) Continuation-in-part of application No. 14/264,728, filed on Apr. 29, 2014, now Pat. No. 10,657,483.

(51) Int. Cl.
*G07C 9/20* (2020.01)
*G06T 19/00* (2011.01)
(Continued)

(52) U.S. Cl.
CPC ............ *G07C 9/20* (2020.01); *G06Q 10/1097* (2013.01); *G06T 19/006* (2013.01);
(Continued)

(58) Field of Classification Search
CPC ........ G07C 9/20; G07C 9/38; G07C 9/00896; G06Q 10/1097; G06T 19/006; G08B 13/00; G08B 13/19695
See application file for complete search history.

(56) References Cited

U.S. PATENT DOCUMENTS

| 4,661,804 A | * | 4/1987 | Abel ..................... G08B 25/10 340/531 |
| 5,865,368 A | | 2/1999 | Taylor et al. |

(Continued)

FOREIGN PATENT DOCUMENTS

| JP | 2011077835 A | 4/2011 |
| KR | 1020010016412 A | 3/2001 |

(Continued)

OTHER PUBLICATIONS

Shemkus, Sarah, "Pressure to deliver: For FedEx, UPS holiday challenge includes throwing off the thieves," Boston Globe, Boston Globe Media Partners LLC, Boston, Massachusetts, B.5, Dec. 19, 2012.*

(Continued)

*Primary Examiner* — Nathan Erb
(74) *Attorney, Agent, or Firm* — Holland & Hart, LLP

(57) ABSTRACT

Methods and systems are described for enabling secure access using a security and/or automation system. According to at least one embodiment, an apparatus for enabling secure access using a security and/or automation system includes a processor, a memory in electronic communication with the processor, and instructions stored in the memory which are executable by a processor to determine information regarding a service associated with a premises, detect a service personnel associated with the service arriving at the premises; unarm a designated area within the premises and verify that a remaining area within the premises is armed, and provide instructions to the service personnel regarding how to access the designated area within the premises.

18 Claims, 10 Drawing Sheets

(51) Int. Cl.
  *G06Q 10/10* (2012.01)
  *G07C 9/00* (2020.01)
  *G08B 13/00* (2006.01)
  *G07C 9/38* (2020.01)
  *G08B 13/196* (2006.01)

(52) U.S. Cl.
  CPC ........... *G07C 9/00896* (2013.01); *G07C 9/38* (2020.01); *G08B 13/00* (2013.01); *G08B 13/19695* (2013.01)

(56) References Cited

U.S. PATENT DOCUMENTS

| | | | |
|---|---|---|---|
| 6,138,910 A | 10/2000 | Madruga | |
| 6,323,782 B1 | 11/2001 | Stephens et al. | |
| 6,476,858 B1 | 11/2002 | Ramirez et al. | |
| 6,570,488 B2 | 5/2003 | Kucharczyk et al. | |
| 6,696,918 B2 | 2/2004 | Kucharczyk et al. | |
| 6,725,127 B2 | 4/2004 | Stevens | |
| 6,862,576 B1 | 3/2005 | Turner et al. | |
| 6,879,836 B2 | 4/2005 | Nakamoto et al. | |
| 7,158,941 B1 | 1/2007 | Thompson et al. | |
| 7,518,485 B2 | 4/2009 | Shuster | |
| 7,653,603 B1 | 1/2010 | Holtkamp, Jr. et al. | |
| RE43,178 E | 2/2012 | Ghazarian | |
| 8,261,976 B1 | 9/2012 | Block et al. | |
| 8,493,193 B2 | 7/2013 | Louis et al. | |
| 9,161,164 B2 | 10/2015 | Proctor et al. | |
| 9,418,495 B2 | 8/2016 | Mackin et al. | |
| 9,437,063 B2 | 9/2016 | Schoenfelder et al. | |
| 9,449,317 B2 | 9/2016 | Reblin | |
| 9,536,359 B1 | 1/2017 | Gokcebay | |
| 9,626,857 B2 | 4/2017 | Fokkelman | |
| 9,721,147 B1 | 8/2017 | Kapczynski | |
| 2001/0045180 A1 | 11/2001 | McCormick et al. | |
| 2001/0050615 A1 | 12/2001 | Kucharczyk et al. | |
| 2001/0051877 A1 | 12/2001 | Steval | |
| 2002/0027981 A1 | 3/2002 | Bedrosian et al. | |
| 2002/0035515 A1* | 3/2002 | Moreno | G07F 9/105 340/5.73 |
| 2002/0046173 A1* | 4/2002 | Kelly | G06Q 10/08 705/50 |
| 2002/0067261 A1 | 6/2002 | Kucharczyk et al. | |
| 2002/0087375 A1* | 7/2002 | Griffin | G06Q 20/12 705/336 |
| 2002/0087429 A1 | 7/2002 | Shuster et al. | |
| 2002/0112174 A1 | 8/2002 | Yager et al. | |
| 2002/0113703 A1 | 8/2002 | Moskowitz et al. | |
| 2002/0138759 A1 | 9/2002 | Dutta et al. | |
| 2002/0147919 A1 | 10/2002 | Gentry et al. | |
| 2002/0156645 A1 | 10/2002 | Hansen et al. | |
| 2002/0178074 A1 | 11/2002 | Bloom et al. | |
| 2002/0180582 A1 | 12/2002 | Nielsen | |
| 2003/0004889 A1 | 1/2003 | Fiala et al. | |
| 2003/0006275 A1 | 1/2003 | Gray et al. | |
| 2003/0022676 A1 | 1/2003 | Nakamoto et al. | |
| 2003/0023870 A1 | 1/2003 | Geros et al. | |
| 2003/0037009 A1 | 2/2003 | Tobin et al. | |
| 2003/0050732 A1 | 3/2003 | Rivalto | |
| 2003/0135432 A1 | 7/2003 | McIntyre et al. | |
| 2003/0195814 A1 | 10/2003 | Striemer et al. | |
| 2004/0149823 A1 | 8/2004 | Aptekar et al. | |
| 2004/0172403 A1 | 9/2004 | Steele et al. | |
| 2004/0185842 A1 | 9/2004 | Spaur et al. | |
| 2004/0243430 A1 | 12/2004 | Horstemeyer et al. | |
| 2004/0252017 A1 | 12/2004 | Holding et al. | |
| 2005/0061877 A1 | 3/2005 | Stevens | |
| 2005/0068178 A1 | 3/2005 | Lee et al. | |
| 2005/0088281 A1 | 4/2005 | Rohrberg et al. | |
| 2005/0131774 A1 | 6/2005 | Huxter | |
| 2005/0187836 A1 | 8/2005 | Wolfe | |
| 2006/0108419 A1 | 5/2006 | Som | |
| 2006/0122852 A1 | 6/2006 | Moudy | |
| 2007/0005452 A1* | 1/2007 | Klingenberg | G06Q 10/0835 705/334 |
| 2007/0024421 A1 | 2/2007 | Hale | |
| 2007/0052586 A1 | 3/2007 | Horstemeyer et al. | |
| 2007/0150375 A1 | 6/2007 | Yang et al. | |
| 2007/0193834 A1* | 8/2007 | Pai | G06Q 10/08 186/3 |
| 2007/0285227 A1 | 12/2007 | Timothy et al. | |
| 2008/0121682 A1 | 5/2008 | Grim et al. | |
| 2008/0252723 A1 | 10/2008 | Park | |
| 2009/0179735 A1 | 7/2009 | Van Rysselberghe et al. | |
| 2009/0298491 A1 | 12/2009 | Kadaba et al. | |
| 2010/0059587 A1 | 3/2010 | Miller et al. | |
| 2010/0241564 A1 | 9/2010 | Miller et al. | |
| 2010/0303307 A1 | 12/2010 | Rothschild | |
| 2011/0130134 A1* | 6/2011 | Van Rysselberghe | G07C 9/00571 455/422.1 |
| 2011/0238574 A1 | 9/2011 | Miller et al. | |
| 2011/0276510 A1 | 11/2011 | Turbeville et al. | |
| 2011/0316683 A1 | 12/2011 | Louis et al. | |
| 2012/0030124 A1 | 2/2012 | Cronkright et al. | |
| 2012/0030133 A1 | 2/2012 | Rademaker et al. | |
| 2012/0044050 A1 | 2/2012 | Vig et al. | |
| 2012/0169453 A1 | 7/2012 | Bryla et al. | |
| 2012/0223133 A1 | 9/2012 | Miller et al. | |
| 2012/0226622 A1 | 9/2012 | Gonzalez et al. | |
| 2012/0233085 A1 | 9/2012 | Zimberoff et al. | |
| 2012/0249328 A1 | 10/2012 | Xiong | |
| 2013/0010144 A1 | 1/2013 | Park | |
| 2013/0017812 A1 | 1/2013 | Foster | |
| 2013/0027552 A1 | 1/2013 | Guzik | |
| 2013/0261792 A1 | 10/2013 | Gupta et al. | |
| 2013/0311365 A1 | 11/2013 | Miller et al. | |
| 2014/0046842 A1 | 2/2014 | Irudayam et al. | |
| 2014/0052660 A1* | 2/2014 | Lee | G06Q 10/047 705/338 |
| 2014/0118144 A1* | 5/2014 | Amis | G08B 21/02 340/540 |
| 2014/0156472 A1 | 6/2014 | Stuntebeck et al. | |
| 2014/0195626 A1 | 7/2014 | Ruff et al. | |
| 2014/0221012 A1 | 8/2014 | Uetabira | |
| 2014/0252091 A1* | 9/2014 | Morse | G06Q 10/087 235/385 |
| 2014/0257691 A1 | 9/2014 | Siris | |
| 2014/0266669 A1 | 9/2014 | Fadell et al. | |
| 2014/0279596 A1 | 9/2014 | Waris et al. | |
| 2014/0279666 A1 | 9/2014 | Lievens | |
| 2014/0317005 A1 | 10/2014 | Balwani et al. | |
| 2014/0324192 A1* | 10/2014 | Baskaran | G05B 15/02 700/19 |
| 2014/0334684 A1 | 11/2014 | Strimling | |
| 2014/0351125 A1 | 11/2014 | Miller et al. | |
| 2015/0058056 A1* | 2/2015 | Comerford | G06Q 10/1095 705/7.19 |
| 2015/0102903 A1* | 4/2015 | Wilkinson | A47G 29/141 340/5.61 |
| 2015/0123766 A1 | 5/2015 | St. John | |
| 2015/0142594 A1 | 5/2015 | Lutnick et al. | |
| 2015/0143461 A1 | 5/2015 | Uetabira | |
| 2015/0186869 A1 | 7/2015 | Winters et al. | |
| 2015/0187136 A1* | 7/2015 | Grimaud | G06T 19/006 345/420 |
| 2015/0194000 A1 | 7/2015 | Schoenfelder et al. | |
| 2015/0199673 A1 | 7/2015 | Savolainen et al. | |
| 2015/0199857 A1 | 7/2015 | Mackin et al. | |
| 2015/0221151 A1 | 8/2015 | Bacco et al. | |
| 2015/0261956 A1 | 9/2015 | Anderson et al. | |
| 2015/0302495 A1* | 10/2015 | Stuckman | G06Q 10/0833 705/26.35 |
| 2015/0310443 A1 | 10/2015 | Thomasson | |
| 2016/0027093 A1 | 1/2016 | Crebier | |
| 2016/0088287 A1 | 3/2016 | Sadi et al. | |
| 2016/0105644 A1 | 4/2016 | Smith et al. | |
| 2016/0142644 A1 | 5/2016 | Lin et al. | |
| 2016/0171435 A1 | 6/2016 | Newton et al. | |
| 2016/0185503 A1 | 6/2016 | Balwani | |
| 2016/0259928 A1 | 9/2016 | Donenfeld | |
| 2016/0301674 A1 | 10/2016 | Uetabira | |
| 2016/0371620 A1* | 12/2016 | Nascenzi | G06Q 50/22 |

(56) References Cited

U.S. PATENT DOCUMENTS

| | | | |
|---|---|---|---|
| 2017/0109950 A1 | 4/2017 | Bacco et al. | |
| 2017/0149758 A1 | 5/2017 | Uetabira | |
| 2017/0213033 A1 | 7/2017 | Anderson et al. | |
| 2017/0236101 A1 | 8/2017 | Irudayam et al. | |
| 2017/0372321 A1 | 12/2017 | Weiss | |
| 2018/0151013 A1 | 5/2018 | Carstens et al. | |
| 2018/0232976 A1 | 8/2018 | Schoenfelder et al. | |
| 2018/0322289 A1 | 11/2018 | Anderson et al. | |
| 2019/0114853 A1 | 4/2019 | Schoenfelder et al. | |

FOREIGN PATENT DOCUMENTS

| | | |
|---|---|---|
| KR | 1020060111749 A | 10/2006 |
| KR | 1020130082790 A | 7/2013 |
| WO | 2007098217 A2 | 8/2007 |

OTHER PUBLICATIONS

Vast-Binder Jr., John Philip, Mailman: Studies of Urban Letter Carriers, Northwestern University, Evanston, Illinois, Aug. 1973.

International Search Report and Written Opinion of the International Searching Authority for PCT/US2015/026930, dated Jul. 28, 2015.

English machine translation of JP 2011-077835, Apr. 14, 2011.

English machine translation of KR 10-2001-0046412, Mar. 5, 2001.

English machine translation of KR 10-2006-0111749, Oct. 30, 2006.

English machine translation of KR 10-2013-0082790, Sep. 22, 2013.

Guo, H. et al., "Joint Video Stitching and Stabilization from Moving Cameras," IEEE Transactions on Image Processing, vol. 25, No. 11, Nov. 2016, pp. 5491-5503.

Jiang, W. et al., "Video Stitching with Spatial-Temporal Content-Preserving. Warping," Computer Vision and Pattern Recognition Workshops (CVPRVV), 2015 IEEE Conference on Date of Conference: Jun. 7-12, 2015 Date Added to IEEE. Xplore: Oct. 26, 2015, Electronic ISSN: 2160-7516 INSPEC Accession No. 15554203 DOI: 10.1109/CVPRW.2015.7301374.

Rieffel, E. G. et al., "Geometric Tools for Multicamera Surveillance Systems," Distributed Smart Cameras, 2007, ICDSC '07, First ACM/IEEE International Conference on Date of Conference: Sep. 25-28, 2007, FX Palo Alto Laboratory, Palo Alto, CA, Oct. 22, 2007, 8 pp.

Extended European Search Report for EP Application No. 15786776.3, dated Aug. 9, 2017 (7 pp.).

PCT International Search Report for International Application No. PCT/US2018/030240, dated Aug. 14, 2018 (3 pp.).

Walmsley, Andrew, "Not-so-special delivery," Marketing, 12, London, Haymarket Business Publications Ltd., Jan. 12, 2011.

* cited by examiner

TECHNIQUES FOR SECURING A DROPSPOT

CROSS REFERENCE TO RELATED APPLICATIONS

The present application is a continuation in part of U.S. patent application Ser. No. 14/264,728, entitled "Systems and Methods for Secure Package Delivery," filed Apr. 29, 2014. The disclosure of which is incorporated by reference herein in its entirety.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of premises automation and home security products. Advancements in mobile devices allow users to monitor a home or business. Information related to secure package delivery, however, is not always readily available. As a result, benefits may be realized by providing systems and methods for secure package delivery in relation to premises automation systems

SUMMARY

The described techniques relate to improved methods, systems, or apparatuses that support techniques for securing a dropspot. Multiple audio or video devices, such as security cameras may be in wireless and/or wired communication together to receive and transmit data related to the delivery of packages and/or the association of the devices. In some examples, a control panel of a security and automation system may monitor and scan a number of sensing devices (e.g., one or more sensors) in a smart environment. The smart environment may be for example a residential structure, a commercial building (e.g., an office, grocery store, or retail store), or an industrial facility (e.g., manufacturing factory), among others. The control panel may be in communication with at least one sensing device to monitor a parameter of a resource associated with the smart environment. A resource may be a service or a product. The service may be a structure management service (e.g., a gardening and lawn care service) or a personal service (e.g., a babysitting service) related to an individual associated with the smart environment. The product may be an a household appliance (e.g., a dishwasher), a consumable item, or a household item (e.g., cosmetics, laundry detergent, light-bulbs, health related items).

In some examples, upon predicting a future change in a condition associated with the parameter of the resource, the control panel may autonomously proceed to perform a function to handle the resource (e.g., replace, replenish, order, schedule), prior to the future change occurring. In some embodiments, the control panel may query an occupant of the security and automation system to receive information regarding a virtual boundary of an area where the service will be performed. In some embodiments, the control panel may unarm a designated area within the virtual boundary and verify that a remaining area within the premises is armed. In some cases, the designated area within the premises is based on a type of the service.

Conventional techniques related to sensing may improve the dependability of the security and automation systems by informing an individual of sensed conditions. However these techniques are inconvenient and demand explicit intervention by the individual. In view of the foregoing, it is desirable to provide a smart sensing system which facilitates monitoring, predicting, and automatic autonomous functions performed by the security and automation system to handle resources of the smart home as necessary, or scheduling services related to the smart home.

According to at least one embodiment, a computer-implemented method for enabling secure delivery of a package to a designated delivery area of a premises is described. In one embodiment, information regarding a delivery of a package to a premises may be received, a delivery person arriving at the premises may be detected, and instructions may be provided to the delivery person regarding how to deliver the package to the designated delivery area within the premises.

In one embodiment, upon verifying information associated with the delivery person (e.g., identity, temporary access code, etc.), the delivery person may be granted access to the delivery area. Additionally, or alternatively, upon verifying that at least one monitored locking mechanism of the premises is in a locked position, the delivery person may be granted access to the delivery area. At least one image (e.g., photos and/or video) may be captured of the delivery person in the delivery area placing the package at the designated delivery location.

In some embodiments, one or more photo and/or video images of the delivery area may be captured and image analysis may be performed on one or more captured images to enable the identification of a designated delivery location within the designated delivery area by detecting an indicator of the designated delivery location. In one embodiment, an occupant of the premises may be requested to select a delivery area and to specify a location within the delivery area where the package is to be placed by the delivery person. In some embodiment, a captured image may be analyzed to determine whether access to the designated delivery location is obstructed. Upon determining access to the designated delivery location is obstructed, a notification may be generated, the notification including information regarding the detected obstruction.

In some embodiments, a location of an occupant of the premises may be determined. Upon determining the location of the occupant is beyond a predefined distance of the premises, a type of delivery may be automatically selected. The type of delivery may specify a location at the premises where the package is to be placed by the delivery person. Upon determining the location of the occupant is within a predefined distance of the premises, the occupant may select a type of delivery.

Upon determining the package is delivered securely, a delivery notification may be sent. The delivery notification may include at least one element of information regarding the delivery of the package, one or more images of the delivered package (photo and/or video), and/or a system security overview. Upon detecting the occupant approaching the premises subsequent to the delivery of the package, a reminder notification may be sent. The reminder notification may include at least one element of a reminder that the package is delivered, information regarding the delivery of the package, and/or an image of the delivered package.

A computing device configured for secure package delivery is also described. The device may include a processor and memory in electronic communication with the processor. The memory may store instructions that may be executable by the processor to receive information regarding a delivery of a package to a premises, detect a delivery person arriving at the premises, and provide instructions to the delivery person regarding how to deliver the package to the designated delivery area within the premises.

A computer-program product for secure package delivery is also described. The computer-program product may include a non-transitory computer-readable medium that stores instructions. The instructions may be executable by the processor to receive information regarding a delivery of a package to a premises, detect a delivery person arriving at the premises, and provide instructions to the delivery person regarding how to deliver the package to the designated delivery area within the premises.

Another method for security and/or automation systems for securing a dropspot is disclosed. According to at least on embodiment, the method may include determining information regarding a service associated with a premises, detecting a service personnel associated with the service arriving at the premises, unarming a designated area within the premises and verifying that a remaining area within the premises is armed, and providing instructions to the service personnel regarding how to access the designated area within the premises. In some cases, the designated area within the premises is based at least in part on a type of the service.

In some embodiments, determining information regarding the service may include receiving real-time usage data of a resource associated with the service from a sensor, predicting a future change in condition associated with the resource based at least in part on the real-time usage data, and automatically scheduling the service personnel to visit the premises and perform an action associated with the service based at least in part on the predicted future change.

In some embodiments, the method may further include determining a virtual boundary of the designated area, and transmitting for display on a device of the service personnel, the virtual boundary of the designated area. In some cases, the remaining area within the premises is located outside the virtual boundary and the virtual boundary is superimposed over a real-time camera feed of the designated area.

In some embodiments, the transmitting may include receiving a real-time camera feed of the designated area from the device of the service personnel, updating the real-time camera feed by superimposing the virtual boundary over the real-time camera feed of the designated area, and transmitting the updated real-time camera feed for display on the device of the service personnel. In some cases, the virtual boundary is superimposed using one or more techniques to generate an augmented reality.

In some embodiments, the method may further include receiving an input identifying the virtual boundary of the designated area from a user of the security and/or automation system. In some cases, determining the virtual boundary of the designated area is based at least in part on the received input.

In some embodiments, receiving the input includes transmitting to the user of the security and/or automation system, an image of the premises and the type of the service, and receiving a tactile input identifying the virtual boundary of the designated area on the image of the premises. In a further embodiment, providing the instructions to the service personnel includes transmitting access information to the service personnel based at least in part on detecting the service personnel, wherein the access information comprises at least one of a random code, a personal identification number (PIN), or other instructions to detect the virtual boundary of the designated area prior to providing the service, or any combination thereof.

In a further embodiment, the method may include receiving authentication information associated with the service personnel, and verifying the authentication information associated with the service personnel. In some cases, the authentication information is based at least in part on the transmitted access information and unarming the designated area within the premises is based at least in part on the verifying.

In some embodiments, the method may further include tracking real-time usage data of a resource associated with the service, retrieving, from a database, historical usage data associated with the service based at least in part on the tracking, and identifying an upcoming instance of the service based at least in part on the real-time usage data and the historical usage data, wherein determining information regarding the service is based on the identifying.

In some embodiments, the method may further include identifying a schedule information associated with an occupant of the premises; and automatically scheduling the service personnel to visit the premises and perform an action associated with the service based at least in part on the schedule information of the occupant of the premises.

In some embodiments, determining scheduling the service personnel may include transmitting, to a device of the service provider, a message indicating a service request, wherein the message comprises at least one of a payment information, a geolocation information of the premise, a contact information of an occupant, or any combination thereof, and receiving, from the device, a confirmation message in response to the service request.

In one example, the method may further include, upon determining a secure completion of the service, sending a completion notification to a user of the security and/or automation system, wherein the completion notification comprises at least one of information regarding the completion of the service, an image of the designated area after completion of the service, or a combination thereof. In some embodiments, the service is a premises management service or a personal service related to an individual associated with the premises.

In one example, the premises management service comprises at least one of a gardening and lawn care service, an internet-provider service, a housekeeping service, a laundry service, a plumbing service, a maintenance service, a termite and pest control service, a water softener service, or any combination thereof. In another example, the personal service comprises at least one of a delivery service, a babysitting service, a nursing care service, a pet sitting service, a medical provider visit service, or any combination thereof.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

Figure 1:
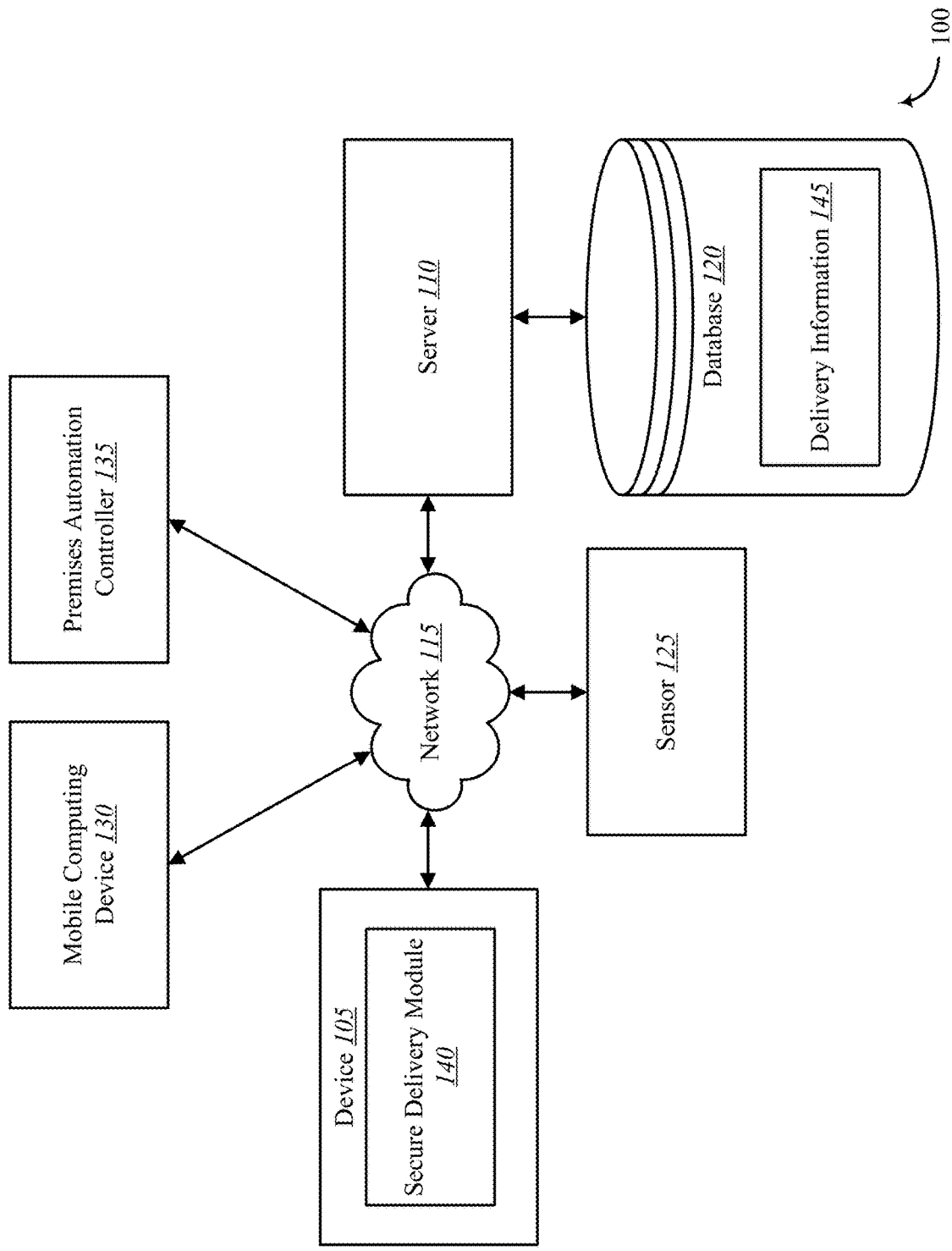
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to premises automation. More specifically, the systems and methods described herein relate to secure delivery of a package to a designated delivery area within a premises. Currently, several drawbacks exist with the current delivery model. For example, the typical delivery to a home or residence includes the delivery person approaching the front door, knocking on the door and/or ringing the doorbell, waiting for an occupant to answer the door, and leaving the package near the doorstep if no one answers the door. In most cases, the delivery person simply knocks on the door and leaves the package on the door step without waiting for someone to answer the door. This delivery model leaves the package vulnerable to theft as the package may be easily visible from the street. Theft of delivered packages from door steps is a significant problem during the holiday season when the number of package deliveries increases dramatically.

Another issue with the current delivery model is that some packages require a signature in order for the delivery person to release custody of the package. In these cases, the delivery person will wait for someone to answer the door after knocking. However, if no one answers the door, the delivery person may leave a note indicating that an attempt was made to deliver the package and that the delivery person will return on a specified day to attempt again to deliver the package. If no one answers the door on the second delivery attempt, the delivery person will leave a note indicating that the recipient may pick up the package at a designated delivery location. This current structure results in additional costs and inconvenience to both delivery companies as well as the recipients of the packages.

Accordingly, the present systems and methods resolve these and other issues by enabling the secure delivery of packages to a designated delivery area within the premises. Even when no one is home or present at a business, a delivery person may be enabled to deliver a package to a designated area of a premises without granting the delivery person full access to the premises. For example, an automated system may grant the delivery person access to a garage area of a premises while ensuring all other access points to the premises area are locked and secure (e.g., ensuring the door from inside the premises to the garage area is locked, etc.). In another example, an automated system may grant the delivery person access to a lobby of a business while ensuring other access points to the business are locked and secure. In addition, the system may monitor the delivery area while the delivery person is delivering the package, capturing one or more photo and/or video images of the delivery area which may be captured and sent to one or more occupants of the premises in real-time to enable the occupant to monitor the delivery in-progress.

In some embodiments, an occupant of a security and automation system may determine a virtual boundary of an area where a package is delivered. In some cases, premises within the virtual boundary may be unarmed upon detecting a delivery person, and the remaining area of the premises may remain armed. In one example, the occupant of the security and automation system may provide the virtual boundary as a tactile input on a camera feed. In some embodiments, upon detecting the delivery person, the delivery person may be instructed to turn on a camera on a device associated with the delivery person. In some cases, the camera feed may be updated by superimposing the virtual boundary over the real-time camera feed of the designated area. In some cases, the virtual boundary is superimposed using techniques to generate an augmented reality. In some examples, the described techniques relate to improved methods, systems, or apparatuses may be applied to any other service personnel.

In some examples, the described techniques relate to improved methods, systems, or apparatuses may be applied to that support smart sensing and scheduling of service using a security and automation system. The smart home environment may have a control panel that an individual may use to apply settings, preferences, and reminders, which the system may use in combination with additional data received from a sensing device (e.g., a sensor), to provide programmed control to a subsystem of the security and automation system (e.g. a heating, ventilation and air condition (HVAC) system, a lighting system, a home theater and entertainment system, or a security system). In some cases, a sensing device may be a multi-sensing device capable of sensing multiple conditions (e.g., motion, temperature, light, audio).

In some examples, the control panel may be in communication with at least one sensing device to monitor a parameter of a resource associated with a smart environment. A resource may be a service or a product. The control panel may predict a future change in a condition associated with the parameter of the resource based on the monitoring. Upon determining a future changes, the control panel may receive and process the information to identify a function to perform.

In some embodiments, the control panel may communicate (e.g., automatically) and perform one or more functions with the third-party enterprise. For example, the control panel may provide ordering information to the third-party enterprise, or a schedule an appointment with the third-party enterprise to respond to the generated information.

In some examples, the at least one sensing device may be a consumables sensor. The consumables sensor may be a multi-sensing component that may be embedded or integrated with a physical compartment that stores consumable items (e.g., foods). For example, a physical compartment may include a refrigerator. Alternatively, the physical compartment may be an unrefrigerated compartment (e.g., pantry). The consumable sensor may record, track and provide information associated with an inventory of consumable items stored in the physical compartment. In some cases, the consumable sensor may identify one or more consumable items that may need to be replenished. In some cases, the control panel may autonomously communicate with the vendor to schedule an order and deliver of the required consumables items.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 is a block diagram illustrating one embodiment of an environment 100 in which the present systems and methods may be implemented. In some embodiments, the systems and methods described herein may be performed on a device (e.g., device 105). The environment 100 may include a device 105, a server 110, a sensor 125, a mobile computing device 130, a premises automation controller 135, and a network 115 that allows the device 105, the server 110, the mobile computing device 130, premises automation controller 135, and sensor 125 to communicate with one another.

Examples of the device 105 may include a remote actuated locking mechanism, a remote actuated garage door controller, a remote actuated gate controller, mobile computing device, smart phone, personal computing device, computer, server, etc.

Examples of the server 110 may include a server administered by a delivery company (e.g., UPS, FedEx, DHL, etc.), a server administered by a premises automation and/or security company, and the like. Accordingly, in some embodiments, environment 100 includes connections to two or more servers (e.g., a connection to a delivery company server and a connection to a premises security company, etc.). Examples of the premises automation controller 135 may include a dedicated premises automation computing device (e.g., wall-mounted controller), a personal computing device (e.g., laptop, desktop, etc.), a mobile computing device (e.g., tablet computing device, smart phone, etc.), and the like.

Examples of sensor 125 include a camera sensor, audio sensor, forced entry sensor, shock sensor, proximity sensor, boundary sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, temperature sensor, heartbeat sensor, breathing sensor, oxygen sensor, carbon dioxide sensor, brain wave sensor, movement sensor, voice sensor, and the like. Sensor 125 may represent one or more separate sensors or a combination of two or more sensors in a single device. For example, sensor 125 may represent one or more camera sensors and one or more motion sensors connected to environment 100. Additionally, or alternatively, sensor 125 may represent a combination sensor such as both a camera sensor and a motion sensor integrated in the same device. Sensor 125 may be integrated with a facial recognition system. Although sensor 125 is depicted as connecting to device 105 over network 115, in some embodiments, sensor 125 may connect directly to device 105.

Additionally, or alternatively, sensor 125 may be integrated with a home appliance or fixture such as a light bulb fixture. Sensor 125 may include an accelerometer to enable sensor 125 to detect a movement. For example, sensor 125 may be attached to a set of golf clubs in a garage area. Sensor 125 may include a wireless communication device enabling sensor 125 to send and receive data and/or information to and from one or more devices in environment 100. Additionally, or alternatively, sensor 125 may include a GPS sensor to enable sensor 125 to track a location of sensor 125 attached to an asset. Sensor 125 may include a proximity sensor to enable sensor to detect a proximity of a person relative to an object to which the sensor is attached and/or associated. In some embodiments, sensor 125 may include a forced entry sensor (e.g., shock sensor, glass break sensor, etc.) to enable sensor 125 to detect an attempt to enter an area by force. Sensor 125 may include a siren to emit one or more frequencies of sound (e.g., an alarm).

In some configurations, the device 105 may include a secure delivery module 140. Although the components of the device 105 are depicted as being internal to the device 105, it is understood that one or more of the components may be external to the device 105 and connect to device 105 through wired and/or wireless connections. In some embodiments, an application may be installed on mobile computing device 130, the application enabling a user to interface with a function of device 105, secure delivery module 140, premises automation controller 135, and/or server 110.

In some embodiments, device 105 may communicate with server 110 via network 115. Example of networks 115 include cloud networks, local area networks (LAN), wide area networks (WAN), virtual private networks (VPN), wireless networks (using 802.11, for example), cellular networks (using 3G and/or LTE, for example), etc. In some configurations, the network 115 may include the internet. It is noted that in some embodiments, the device 105 may not include a secure delivery module 140. For example, device 105 may include logic and/or executable instructions that enables device 105 to interface with premises automation controller 135, mobile computing device 130, and/or server 110. In some embodiments, device 105, mobile computing device 130, premises automation controller 135, and server 110 may include a secure delivery module 140 where at least a portion of the functions of secure delivery module 140 are performed separately and/or concurrently on device 105, mobile computing device 130, premises automation controller 135, and/or server 110. Likewise, in some embodiments, a user may access the functions of device 105 and/or premises automation controller 135 (directly or through device 105 via secure delivery module 140) from mobile computing device 130. For example, in some embodiments, mobile computing device 130 includes a mobile application that interfaces with one or more functions of device 105, premises automation controller 135, secure delivery module 140, and/or server 110.

In some embodiments, server 110 may be coupled to database 120. Database 120 may include delivery information 145. For example, device 105 may access delivery information 145 in database 120 over network 115 via server 110. Database 120 may be internal or external to the server 110. In one example, device 105 may be coupled directly to database 120, database 120 being internal or external to device 105.

Secure delivery module 140 may allow a user to control (either directly or via premises automation controller 135), from a subscription-content media set top box, an aspect of the home of the user, including security, locking or unlocking a door, checking the status of a door, locating a person or item, controlling lighting, thermostat, cameras, and the like. Further details regarding the secure delivery module 140 are discussed below.

Figure 2:
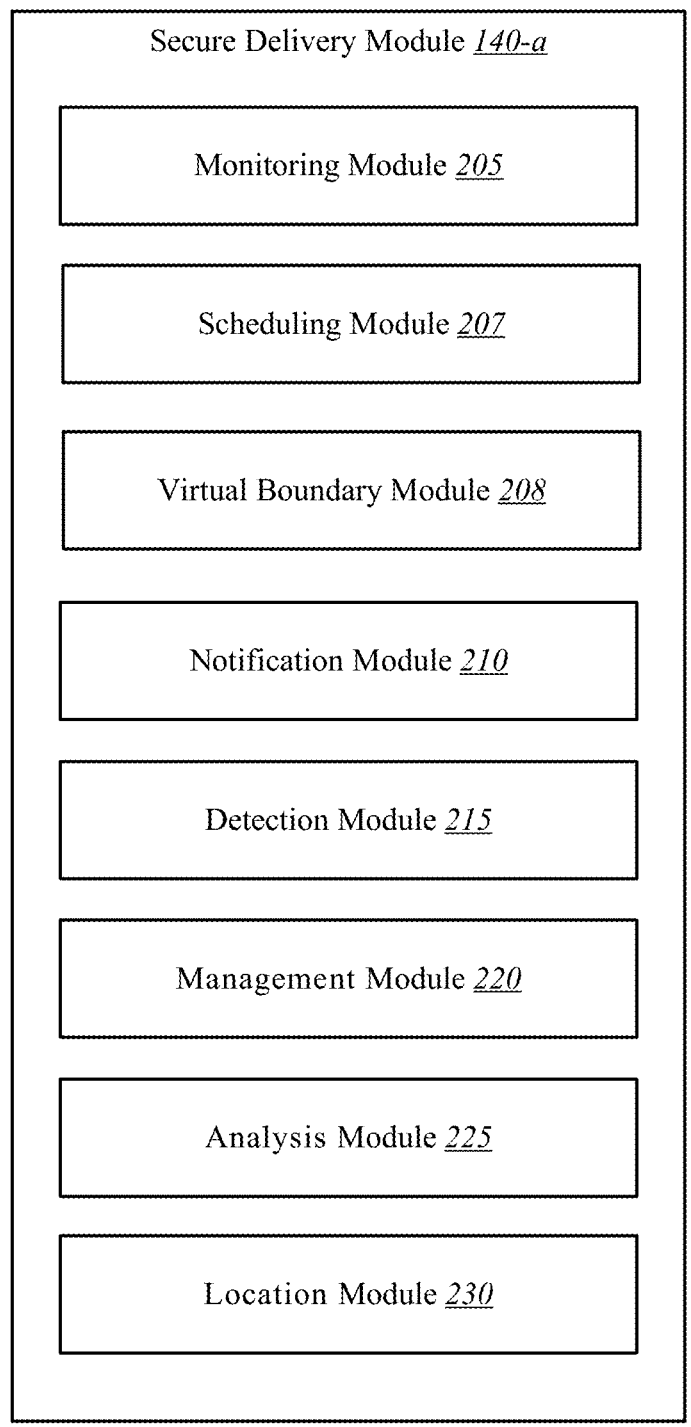
FIG. 2 is a block diagram illustrating one example of a secure delivery module in accordance with aspects of the present disclosure.

FIG. 2 is a block diagram illustrating one example of a secure delivery module 140-a. Secure delivery module 140-a may be one example of secure delivery module 140 depicted in FIG. 1. As depicted, secure delivery module 140-a may include a monitoring module 205, a scheduling module 207, a virtual boundary module 208, a notification module 210, a detection module 215, a management module 220, an analysis module 225, and a location module 230.

In one embodiment, monitoring module 205 may receive information regarding a delivery of a package to a premises such as home or business. The information received may include a delivery company name, delivery person information (e.g., delivery person name, photo ID, work ID, etc.), a unique code associated with the company (e.g., barcode, QR code, etc.), a unique code associated with the delivery person, scheduled date of delivery, an expected time of delivery (e.g., a window of time), tracking number, number of packages, weight of each package, dimensions of each package, etc. In some cases, monitoring module 205 may be granted access to a user account associated with a delivery company. Thus, in some cases, monitoring module 205 may query delivery information by accessing the user account, from which monitoring module 205 may receive notices of expected deliveries, real-time updates to the delivery information, real-time notices of a delivery person's arrival at the premises, etc. In some cases, notification module 210 may generate one or more notifications based on the received information regarding a delivery of a package to the premises.

In one embodiment, the monitoring module 205 may determine information regarding a service associated with a premises. In one example, the service is a premises management service or a personal service related to an individual associated with the premises. For example, the premises management service may include at least one of a gardening and lawn care service, an internet-provider service, a housekeeping service, a laundry service, a plumbing service, a maintenance service, a termite and pest control service, a water softener service, or any combination thereof. In another example, the personal service may include at least one of a delivery service, a babysitting service, a nursing care service, a pet sitting service, a medical provider visit service, or any combination thereof.

In some embodiments, the monitoring module 205 may track real-time usage data of a resource. For example, the monitoring module 205 may track the real-time usage of groceries in a refrigerator. In some cases, the monitoring module 205 may retrieve historical usage data associated with the service based on the tracking. For example, the monitoring module 205 may the historical usage data from a database (such as database 120). In some embodiments, the monitoring module 205 may identify an upcoming instance of the service based on the real-time usage data and the historical usage data. For example, the monitoring module 205 may be configured to compare the real-time usage data to the historical usage data to determine an upcoming instance of the service. In some examples, the monitoring module 205 may be configured to monitor a premises to determine whether a service needs to be scheduled for the premises. For example, the monitoring module 205 may determine that a laundry basket is ready to be picked up by a laundry service and may notify a scheduling module 207. The scheduling module 207 may schedule a service appointment with the laundry service.

In another example, the monitoring module 205 may receive real-time usage data of a resource associated with a service from a sensor. Upon receiving the real-time usage data, the monitoring module 205 may be configured to predict a future change in condition associated with the resource based on the real-time usage data. For example, the monitoring module 205 may monitor usage information for bath products in a bathroom. Upon predicting that the bath product bottle is nearly empty, the monitoring module 205 may instruct the scheduling module 207 to schedule a delivery for the bath product. In some embodiments, the scheduling module 207 may automatically schedule a service personnel to visit the premises and perform an action associated with the service. In some cases, the scheduling module 207 may identify a schedule information associated with an occupant of the premises. For example, the scheduling module 207 may access the occupant's calendar to identify an appropriate time for scheduling the service personnel. For example, the scheduling module 207 may schedule the service personnel to visit the premises and perform an action associated with the service based on the schedule information of the occupant of the premises.

In some embodiments, the scheduling module 207 may transmit a message indicating a service request to a device of the service provider. For example, the service request may include at least one of a payment information, a geolocation information of the premise, a contact information of an occupant, or any combination thereof. In some cases, the scheduling module 207 may be configured to receive a confirmation message from the device of the service provider. In some examples, the scheduling module 207 may be configured to wait for a threshold time period for the confirmation message before canceling the service request. After canceling the service request, the scheduling module 207 may be identify a second service provider and may transmit the service request message to the second service provider.

In some embodiments, virtual boundary module 208 may be configured to determine a virtual boundary of the designated area. In some cases, a service personnel is instructed to remain within the virtual boundary of the designated area and a remaining area within the premises is located outside the virtual boundary. In one example, the virtual boundary module 208 may receive an input identifying the virtual boundary of the designated area. In some cases, the virtual boundary module 208 may receive the input from a user of the security and/or automation system. In some cases, the input may be a tactile input identifying the virtual boundary of the designated area. For example, the user of the security and/or automation system may provide an outline of the virtual boundary by drawing the virtual boundary on a user device.

In some cases, the virtual boundary module 208 may determine the virtual boundary of the designated area is based on the received tactile input. In some examples, the virtual boundary module 208 may automatically determine the virtual boundary based on a type of service. For example, the monitoring module 205 may indicate that a package delivery service is an upcoming service that has been scheduled for the home. Upon receiving this indication, the virtual boundary module 208 may send an inquiry to the package delivery company to determine whether the package is perishable or non-perishable. In one example, if the virtual boundary module 208 identifies that the package includes at least one non-perishable item, then the virtual boundary module 208 may determine the virtual boundary around a porch area. In another example, if the virtual boundary module 208 identifies the package includes at least one perishable item, then the virtual boundary module 208 may determine the virtual boundary around a foyer area of the home.

In some embodiments, the virtual boundary module 208 may be configured to transmit an image of the premises and the type of the service to the user of the security and/or automation system. For example, the virtual boundary module 208 may transmit an image of the layout of the premises to the user and the user may draw the virtual boundary on the image of the layout of the premises. In some examples, the virtual boundary module 208 may receive information associated with the virtual boundary in form of a tactile input from the user. In some cases, the area within the virtual boundary is unlocked when a service personnel is detected, and the remaining area may remain locked.

In one example, detection module 215 may detect a delivery person arriving at the premises. In some cases, the detection module 215 may detect a service personnel associated with the service arriving at the premises. In some cases, monitoring module 205 may determine a location of a delivery vehicle. The location of the delivery vehicle may be determined by a location device on the delivery vehicle such as a global positioning system (GPS), the delivery person providing information regarding his or her location (e.g., present delivery location, next delivery location, etc.), and the like. Accordingly, monitoring module 205 may receive information indicating that the delivery vehicle is at and/or within a predefined distance of the premises. Detection module 215 may be configured to recognize a delivery vehicle, a delivery uniform, a delivery company logo, etc. Thus, in some cases, upon receiving information indicating the delivery vehicle is at or near the premises, detection module 215 may scan captured images to detect a delivery vehicle and/or delivery person. In some examples, the detection module 215 may determine a type of service associated with the personnel arriving at the premises. In some cases, the detection module 215 may authenticate the service personnel arriving at the premises.

In some cases, the delivery person may ring a doorbell and/or knock on the door of the premises and/or trigger a motion detector. Upon detecting the delivery person at the door, a camera may capture a photo and/or video image of delivery person. The detection module 215 may compare a captured image to an image of the delivery person provided by the delivery company (e.g., a photo ID of the delivery person provided in the information received by the monitoring module 205). In some embodiments, the detection module 215 may transmit access information to the service personnel arriving at the premises. In some cases, the access information may be based on detecting the service personnel. In some examples, the access information may include at least one of a random code, a personal identification number (PIN), or other instructions to detect the virtual boundary of the designated area prior to providing the service, or any combination thereof.

In some cases, an automated system (e.g., a prerecorded message, a voice simulated message, etc.) may request that the delivery person stare into the camera in order to capture an image with a similar viewpoint as that of an image of the delivery person provided by the delivery company. Additionally, or alternatively, a delivery person may be instructed to place an identification card in relation to the camera. The identification card may include a photo ID of the delivery person, a delivery person name, a company name, a company logo, a unique code (e.g., barcode, QR code, etc.), short-range communication capabilities (e.g., radio frequency ID (RFID), near-field communication (NFC), etc.), and the like. Upon receiving data from and/or capturing an image of the identification card, the detection module 215 may use any combination of the captured information (e.g., photo ID, name, barcode, RFID, etc.) to verify the identity of the delivery person. In some cases, such as when the delivery person arrives outside an expected period of time, additional verification may be requested.

In some embodiments, the detection module 215 may receive authentication information associated with the service personnel. In some cases, the authentication information may be based on the transmitted access information. For example, the authentication information may be based on a PIN transmitted to the service personnel prior to the arrival of the service personnel. In some cases, the authentication information may be a random code transmitted to a device of the service personnel (such as, the delivery person). In some examples, the detection module 215 may verify the authentication information associated with the service personnel. For example, the detection module 215 may compare the received authentication information with the transmitted access information prior to verifying the authentication information associated with the service personnel.

In some embodiments, before granting the delivery person access to a secure delivery area, the detection module 215 may request the delivery company verify the location of the delivery person. For example, secure delivery module 140-*a* may query a server of the delivery company (e.g., server 110) to determine the current location of the delivery vehicle associated with the expected delivery. Additionally, or alternatively, before granting the delivery person access to a secure delivery area, the detection module 215 may request that the occupant approve granting the delivery person access to the secure delivery location. For example, the occupant may receive a real-time notification regarding the arrival of the delivery person to the premises. Thus, the occupant may receive a live audio and/or photo and/or video image feed of the delivery in progress. In some cases, the occupant may be enabled to communicate with the delivery person in real-time (e.g., between the occupant's mobile computing device and an intercom at the premises over a data network). In some embodiments, the detection module 215 may request that the delivery person enter information associated with the package such as a tracking number and/or an employee identification code. In some cases, the detection module 215 may receive information associated with a virtual boundary from a user of the security and/or automation system at the premises. In some cases, the user may identify the virtual boundary of a designated area where the service may be performed. In some cases, the detection module 215 may determine that the information is sent and/or received by a computing machine owned by the delivery company. For example, the system may determine that the information entered by the delivery person is verified and registered by a secure server owned by the delivery company. Upon verifying that the information is entered and verified by the delivery company, temporary access to the secure delivery area may be granted.

In some embodiments, management module 220 may manage the secure delivery of the package once the arrival of an expected delivery is verified (e.g., verifying delivery information, identity of delivery person, etc.). In some embodiments, the management module 220 may manage the service being performed in the premises. In some cases, management module 220 may provide instructions to the service personnel regarding how to perform the service within the premises. For example, the management module 220 may provide instructions to a delivery person regarding the designated area where to place the delivery at the premises and a virtual boundary around the designated area.

In some examples, the designated area within the premises may be unarmed when the service personnel arrives at the premises and a remaining area within the premises is armed. In some cases, the instructions may be provided to the delivery person upon detecting the delivery person arriving at the premises. For example, the delivery person may knock on the door or ring the doorbell of the premises. Upon detecting the delivery person at the door, a communication device (e.g., a speaker at the door that is part of an intercom system of the premises) may provide instructions to the delivery person. The instructions may include pre-recorded messages, digital text-to-speech messages, and the like. For example, the management module 220 play a recorded message from an intercom at the premises, the recorded message including instructions how and where to deliver the package (e.g., how to get a garage door to open, how to get a front door to unlock, where to place inside the garage of the premises, where to place inside the front door, etc.).

In some embodiments, the management module 220 may provide instructions to the delivery person via a data communication. For example, the delivery person may receive an email, a text message, a radio message (e.g., from a dispatch, etc.), and the like. In some examples, the management module 220 may transmit the virtual boundary of the designated area for display on a device of the service personnel. In some examples, the virtual boundary may be superimposed over a real-time camera feed of the designated area. For example, the management module 220 may receive a real-time camera feed of the designated area from the service personnel and may update the real-time camera feed by superimposing the virtual boundary over the real-time camera feed of the designated area. In some examples, the virtual boundary may be superimposed using one or more techniques to generate an augmented reality. In some cases, the service personnel may be instructed to turn on a camera and capture a real-time feed of the premises. In some cases, the delivery person may be notified that the process of placing the delivery at the designated delivery location will be recorded.

In some embodiments, the management module 220 may send a temporary access code to a device associated with the delivery person. For example, upon detecting the arrival and/or verifying the identity of the delivery person, the management module 220 may send a temporary access code to a device of the delivery person (e.g., smart phone, tablet computing device, BLUETOOTH® device, etc.). The temporary access code may include a temporary electronic key configured to unlock the front door, a temporary frequency code configured to open the garage door wirelessly, or a temporary keypad code configured to open the garage door via a keypad outside the garage door. The temporary access code may be configured to operate only during a predetermined time period (e.g., based on an expected time of delivery received by the monitoring module 205, etc.), upon detecting the arrival of the delivery person, and/or upon authenticating the identity of the delivery person.

In one embodiment, the management module 220 may request an occupant of the premises to select a delivery area and to specify a location within the delivery area where the package is to be placed by the delivery person. The occupant may designate the delivery area by selecting an option presented on a control panel, selecting a location via a smart phone (e.g., mobile computing device 130), speaking a voice command received and interpreted by premises automation controller 135, and the like. In some cases, the occupant may specify the location within the delivery area where the package is to be placed by the delivery person by placing a marker at the specific location. For example, after selecting a garage of the premises as the delivery area, the occupant may place a sign, decal, or other type of indicator on the floor and/or wall of the garage to specify the location of where to place the delivery. In some cases, upon determining a garage as a place for receiving a delivery, the management module 220 may automatically generate a virtual boundary around the garage. Additionally, or alternatively, the occupant may direct a light emitting device (e.g., light emitting diode (LED), LASER, etc.) to shine a light on the specific location of where to place the delivery. For example, the light emitting device may shine a focused beam of light (e.g., similar to a laser pointer) on to the delivery location. The light emitting device may be configured to emit a pattern and/or symbol such as a logo and/or one or more words to indicate the specific location of where to place the delivery. For example, the light emitting device may emit an "arrow" symbol and the words "Place Delivery Here" in relation to the designated location. In some cases, the light emitting device may emit a light of a predetermined color, may flash the light, change the color of the light, etc., to attract the attention of the delivery person. In some embodiments, the light emitting device may be activated upon detecting the delivery person entering the delivery area.

In one embodiment, the management module 220, in conjunction with a camera, may automatically select and designate a delivery area and/or a delivery location within a designated delivery area. For example, upon analyzing one or more areas of the premises, management module 220 may designate a garage of the premises as the delivery area. In some case, management module 220 may select a delivery area configured by the occupant to be the default delivery area. Additionally, or alternatively, management module 220 may store information regarding one or more previous deliveries and analyze the stored information to detect one or more patterns associated with a delivery. Based on the one or more detected patterns, the management module 220 may select a delivery area and/or delivery location within the delivery area. Upon determining the delivery area, the management module 220 may scan the designated delivery area for one or more available locations within the scanned area where a package may be placed by the delivery person. Based on the scan, the management module 220 may designate a delivery location within the delivery area. In some cases, the management module 220 may indicate the designated delivery location with one or more audio and/or visual cues. For example, via a speaker, the management module 220 may instruct the delivery person where to place the package. In some cases, the management module 220 may configure a light emitting device to visually indicate the designated delivery location.

In one embodiment, analysis module 225, in conjunction with a camera (e.g., sensor 125), may capture a photo and/or video image of the delivery area. The analysis module 225 may perform image analysis on a captured image to identify the designated location. For example, analysis module 225 may detect a marker placed by the occupant at the designated location. Upon determining the designated location, the monitoring module 205, in conjunction with a camera, may be configured to monitor the designated delivery location. In one embodiment, the analysis module 225 may analyze the captured image to determine whether access to the designated location is obstructed. For example, a box may be placed in the way of and/or over the designated location, a vehicle may pull into the garage in the way of and/or over the designated location, etc. Upon determining access to the designated location is obstructed by another object, the notification module 210 may generate a notification comprising information regarding the detected obstruction.

In one embodiment, location module 230 may determine a location and/or heading of an occupant of the premises. For example, the location module 230 may determine a distance between the premises and the occupant, a heading of the occupant, and the like. Based on the location and heading of the occupant in relation to previously detected patterns, the location module 230 may determine that the occupant is at the premises, heading away from the premises, heading to the premises, etc. Upon determining the location of the occupant is beyond a predefined distance of the premises, management module 220 may automatically select a type of delivery. The type of delivery may specify a delivery location within a delivery area at the premises where the package is to be placed by the delivery person. In some cases, upon determining the location of the occupant is within a predefined distance of the premises, management module 220 may request the occupant select a type of delivery.

In one embodiment, upon verifying the identity of the delivery person, the management module 220 may grant the delivery person access to the delivery area. For example, the management module 220 may grant the delivery person access to a garage space by actuating a garage door opener or grant access to an entry way of the premises by actuating a door locking mechanism on an exterior door of the premises. Additionally, or alternatively, upon verifying that at least one monitored locking mechanism of the premises is in a locked position, the management module 220 may grant the delivery person access to the delivery area. In some cases, upon granting access to the delivery person, the management module 220, in conjunction with a camera, may capture one or more photo and/or video images of the delivery person in the delivery area while the delivery person places the package at the designated location. Although, the description refers to a delivery person, it is well understood that the invention may apply to any service personnel. In some cases, the management module 220 may send in real-time one or more captured images of the delivery in-progress to the occupant. Thus, the occupant may monitor the delivery in real-time. In some cases, the management module 220 may enable the occupant to communicate with the delivery person in real-time while the delivery person delivers the package.

In some examples, the analysis module 225 may determine a location where the service personnel has performed the service. In some cases, detection module 215 may determine where the delivery person places the package inside the delivery area. Upon determining where the delivery person places the package inside the delivery area, the analysis module 225 may determine whether a difference between the designated delivery location and the actual location where the package is delivered satisfies a predetermined threshold. Upon determining the difference between the designated delivery location and the actual location where the package is delivered satisfies a predetermined threshold, the management module 220 may prompt the delivery person to adjust the location of the package placement. For example, the management module 220 may provide an audio feedback (e.g., play a recorded voice instruction, digitally communicate a text-to-speech instruction, etc.), visual feedback (e.g., a flashing light, a certain color of light). In some cases, management module 220 may provide a continuous visual feedback while the delivery person is delivering the package. For example, upon entering the delivery location, a light emitting device may shine a red light on a surface of the delivery area until the package is placed within a predetermined distance of the designated delivery location. Upon detecting the delivery person placing the package within the predetermined distance of the designated delivery location, the light emitting device may switch from emitting the red light to a green light. Additionally, or alternatively, audio feedback may indicate proper placement of the package at the designated delivery location.

In one embodiment, upon determining the package is delivered securely (e.g., the package is in place, the delivery person has exited the delivery area, the delivery area is secured), the notification module 210 may send a delivery notification to the occupant. The delivery notification may include at least one element of information regarding the delivery of the package, one or more photo and/or video images of the delivered package, and/or a system security overview. The system security overview may include graphical symbols and one or more word descriptions regarding the security of the premises (e.g., a green light symbol next to "front door," a green light symbol next to "garage door," a green light symbol next to "back door," etc.).

In some embodiments, the monitoring module 205 may determine whether a service has been securely completed. For example, if the service is a delivery service, then the monitoring module 205 along with one or more sensors 125 may determine whether a package has been securely delivered. Upon determining a secure completion of the service, the notification module 210 may send a completion notification to a user of the security system. In some examples, the completion notification may include at least one of information regarding the completion of the service, an image of the designated area after completion of the service, or a combination thereof.

In one embodiment, upon detecting the occupant approaching the premises subsequent to a service, notification module 210 may generate and send a reminder notification. For example, upon detecting the occupant approaching the premises subsequent to the delivery of the package, notification module 210 may generate and send a reminder notification notifying that the package has been securely delivered within the designated delivery area. In some cases, the reminder notification may include at least one element of a reminder that the package is delivered, information regarding the delivery of the package, and one or more photo and/or video images of the delivered package. In some examples, the reminder notification may include at least one element of a reminder that the service has been successfully performed, and one or more photo and/or video images of the area after the service has been performed. In some cases, the analysis module 225, in conjunction with a camera, may analyze the location of the delivered package in relation to a location of vehicle parking spot inside the garage. For example, the secure delivery module 140-a may detect one or more patterns and learn when and where a vehicle typically parks inside the garage. For example, the analysis module 225 may determine the probability of a vehicle detected as approaching the premises of being parked in a certain location within the garage. Based on the learned parking pattern, the analysis module 225 may perform a collision risk analysis when detection module 215 detects an approaching vehicle, determining the likelihood of a vehicle entering the garage and colliding with the delivered package. Upon detecting the likelihood of a collision satisfies a predetermined threshold, the notification module 210 may generate and send a warning notification indicating a potential collision.

Figure 3A:
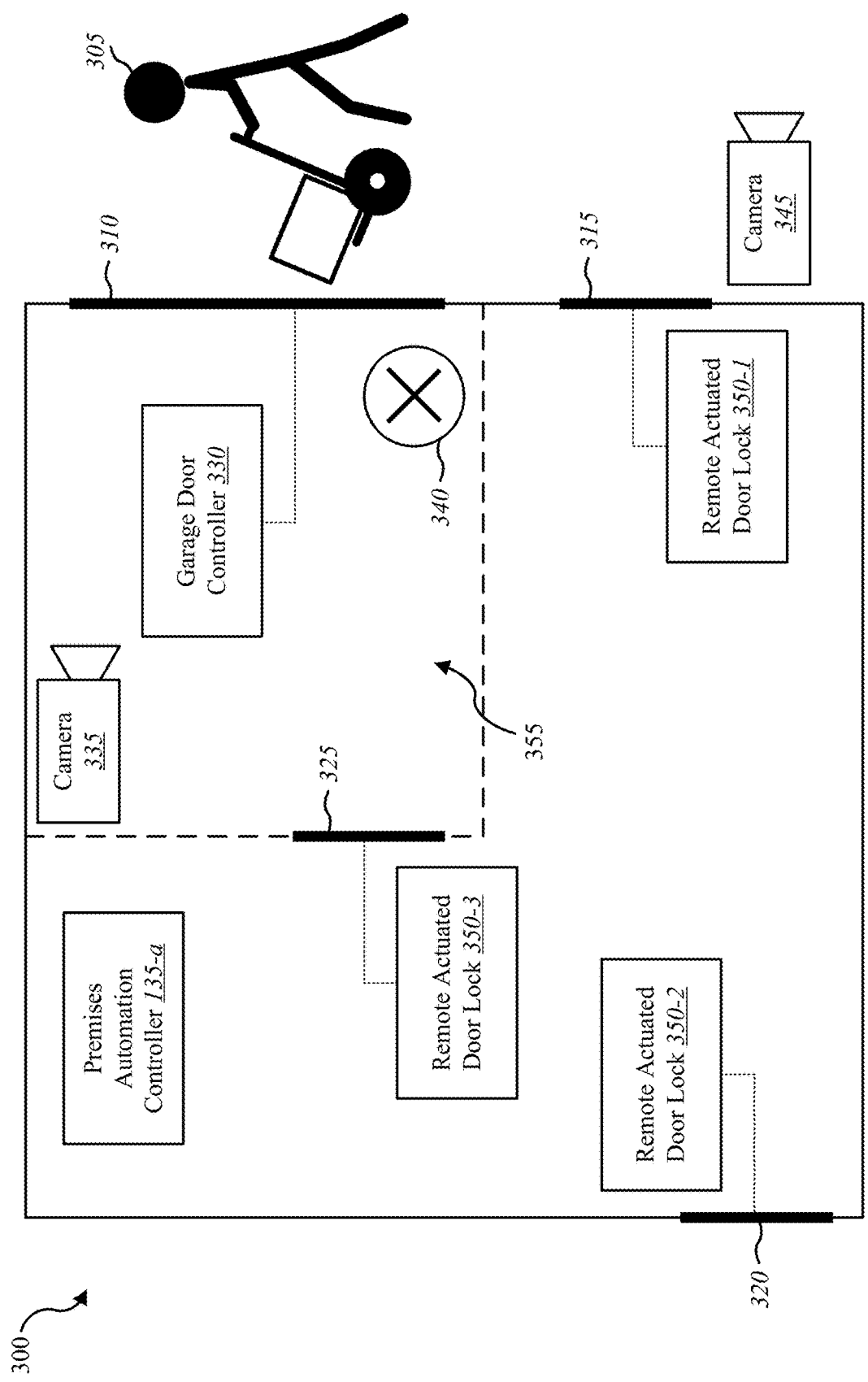
FIG. 3A is a block diagram illustrating one example of a premises for enabling the secure delivery of a package to the premises in accordance with aspects of the present disclosure.

FIG. 3A is a block diagram illustrating one example of a premises 300 for the secure delivery of packages to the premises 300. As depicted, a delivery person 305 may be charged to deliver a package to the premises 300. In one example, the person 305 may be a service personnel associated with providing a service at the premises 300. The premises 300 may include one or more points of entry to control access to certain areas of the premises 300. For example, premises 300 may include a garage door 310, a front door 315, a back door 320, and a door to the garage 325 situated between an interior area of the premises 300 and the garage 355. In some cases premises 300 may include one or more cameras such as camera 335 situated in relation to an area of the garage 355 and/or camera 345 situated in relation to the front door 315. Premises 300 may include a premises automation controller 135-a, which may be one example of premises automation controller 135 of FIG. 1.

In one embodiment, the premises automation controller 135-a, in conjunction with the secure delivery module 140, may detect an arrival of delivery person 305 to premises 300. For example, premises automation controller 135-a may analyze an image captured by camera 345 to determine that the delivery person is at the premises 300. In some cases, camera 345 may capture one or more photo and/or video images in order to verify delivery information such an identity of the delivery person 305, a barcode, etc. Upon verifying the delivery person 305, premises automation controller 135-a may grant the delivery person 305 access to a designated delivery area. In one example, premises automation controller 135-a may send a command to a garage door controller 330 to open the garage door 310. In some cases, before granting access to the delivery person 305, premises automation controller 135-a may verify that one or more locking mechanisms associated with one or more entry ways of premises 300 are in a locking position. For example, before granting access to the delivery person, premises automation controller 135-a may verify that remote actuated door lock 350-1 of front door 315, remote actuated door lock 350-2 of back door 320, and/or remote actuated door lock 350-3 of the door to the garage 325 are in a locked position. In one example, an exterior wall of the garage 355 may include a man door or pass door, a hinged door that provides an additional access point to the garage 355 from outside the premises 300. Thus, in some cases, the delivery person may be granted access to the garage 355 by unlocking a man door or pass door on garage 355.

In some cases, premises automation controller 135-a may grant access to the delivery person 305 by verifying a temporary access code delivered to a device of the delivery person 305. For example, premises automation controller 135-a may send a temporary access code to a smart phone of the delivery person. Upon arriving, premises automation controller 135-a may detect a device of the delivery person transmitting the temporary access code, and upon verifying the temporary access code, grant the delivery person 305 access to the designated delivery area. In the depicted example, premises automation controller 135-a may grant delivery person 305 access to the garage 355 via garage door 310. Upon entering the garage, the delivery person may be enabled to determine where to place the package by observing an indicator 340 of the designated delivery location. In some cases, the designated delivery location may be marked by one or more signs affixed to a surface of the garage 355

(e.g., a wall and/or floor of the garage 355). In some cases, the designated delivery location may be indicated by one or more light emitting devices.

Accordingly, the delivery person 305 may exit the delivery area (e.g., garage 355) after placing the package at the delivery location designated by the indicator 340. After detecting the delivery person 305 placing the delivery at the designated delivery location and the delivery person 305 exiting the garage 355, premises automation controller 135-a may send a command to garage door controller 330 to close the garage door 310. In some cases, premises automation controller 135-a may then send a delivery notification to an occupant of premises 300, whether the occupant is at the premises or away. Although the depicted example is described using premises automation controller 135-a, in some cases one or more described functions may be integrated within garage door controller 330, camera 335, camera 345, and/or remote actuated door locks 350-1, 350-2, and 350-3, any one or combination of which may perform one or more of the above-described functions with or without the premises automation controller 135-a.

In one embodiment, detection module 215, via one or more sensors, may detect a temperature of the delivery area. Additionally, or alternatively, detection module 215 may detect a temperature in association with the one or more items being delivered. For instance, detection module 215 may detect a temperature of a garage area, the temperature of a refrigeration unit (e.g., an ice box, a cooler, a freezer, a fridge, etc.), and/or the temperature of the delivered item. Thus, if an item being delivered were to include perishable items such as food, the notification module 210 may be configured to instruct the delivery person to place the item in a refrigeration unit located at the premises. In some cases, management module 220 may associate a timestamp on the one or more items being delivered, enabling the notification module 210 to notify an occupant of the premises how long a delivered item has been located on the designated delivery location. In some cases, detection module 215 may detect adverse conditions for a delivered item in association with the location where the item was delivered. For example, if conditions of the delivery location change and/or the delivery person does not delivery the item to the proper location (e.g., a refrigeration unit), then notification module 210 may send an alert. For instance, notification module 210 may send an alert if an item remains exposed in a detected adverse condition beyond a predetermined time period. One or more photo and/or video images may be analyzed by analysis module 225 to indicate when a delivered item is removed from the designated delivery location such as being brought inside a premises.

Figure 3B:
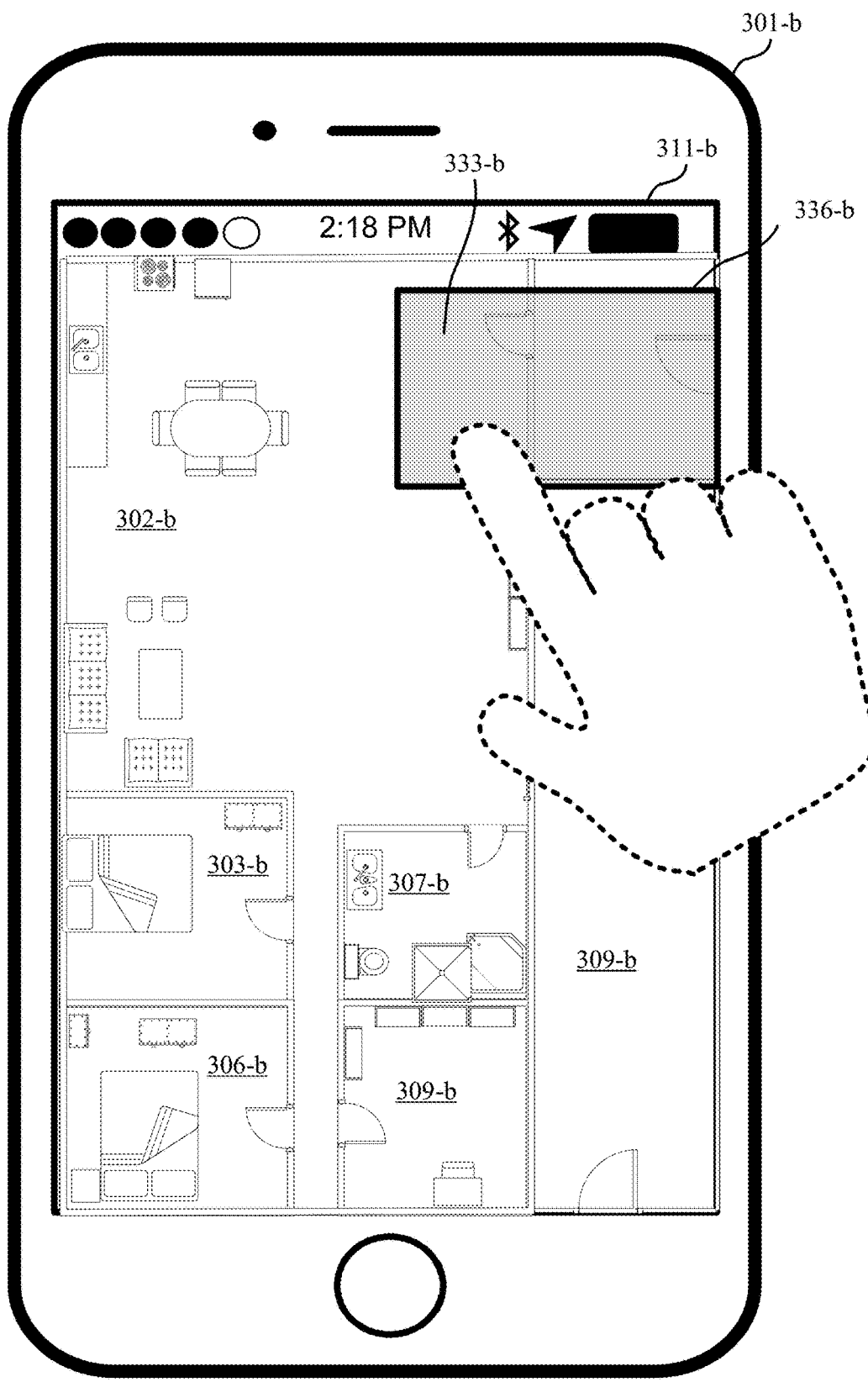
FIG. 3B is a block diagram illustrating an example of a wireless device that supports techniques for securing a dropspot in accordance with aspects of the present disclosure.

FIG. 3B illustrates an example of a wireless device 301-b that supports techniques for securing a dropspot in accordance with aspects of the present disclosure. In the example of FIG. 3B, the user interface 311-b may include a schematic diagram of one example of a premises with a home automation system in accordance with various embodiments. In this example, the user interface 311-b may include a display of a building. The display of the building may include rooms 302-b, 303-b, 306-b, 307-b, and a porch 309-b. Several sensor units 125-a may be distributed within the premises and may be in communication with a home automation system. The sensor units 125-a may be an example of one or more aspects of the sensor units 125 of FIG. 1. The size, location, number, and design of the premises is merely illustrative. Furthermore, the home may be any other type of building or property. Other examples may include more or less rooms and sensor units 125-a, additional home automation system that may be integrated with a different part of the property.

In the example of FIG. 3B, the premises has a virtual boundary 336-b. In this example, the virtual boundary 336-b may be received as an input from a user of the home automation system. In some cases, within the boundary 336-b, the home automation system may have different levels of control. In the example of FIG. 3B, the boundary 336-a includes a portion of the porch 309-b and foyer 333-b but does not include the rest of the premises. In one example, the home automation system may restrict access to the rest of the building while not restricting access to the area within the virtual boundary 336-b. For example, the premises is armed beyond the virtual boundary 336-b and disarmed within the virtual boundary 336-b. Another example of the home automation system 110 restricting access is to maintain the doors and windows to the premises in a locked state. In another case, if a service personnel tries to access area beyond the virtual boundary, then an alarm associated with the premises may turn on.

Figure 3C:
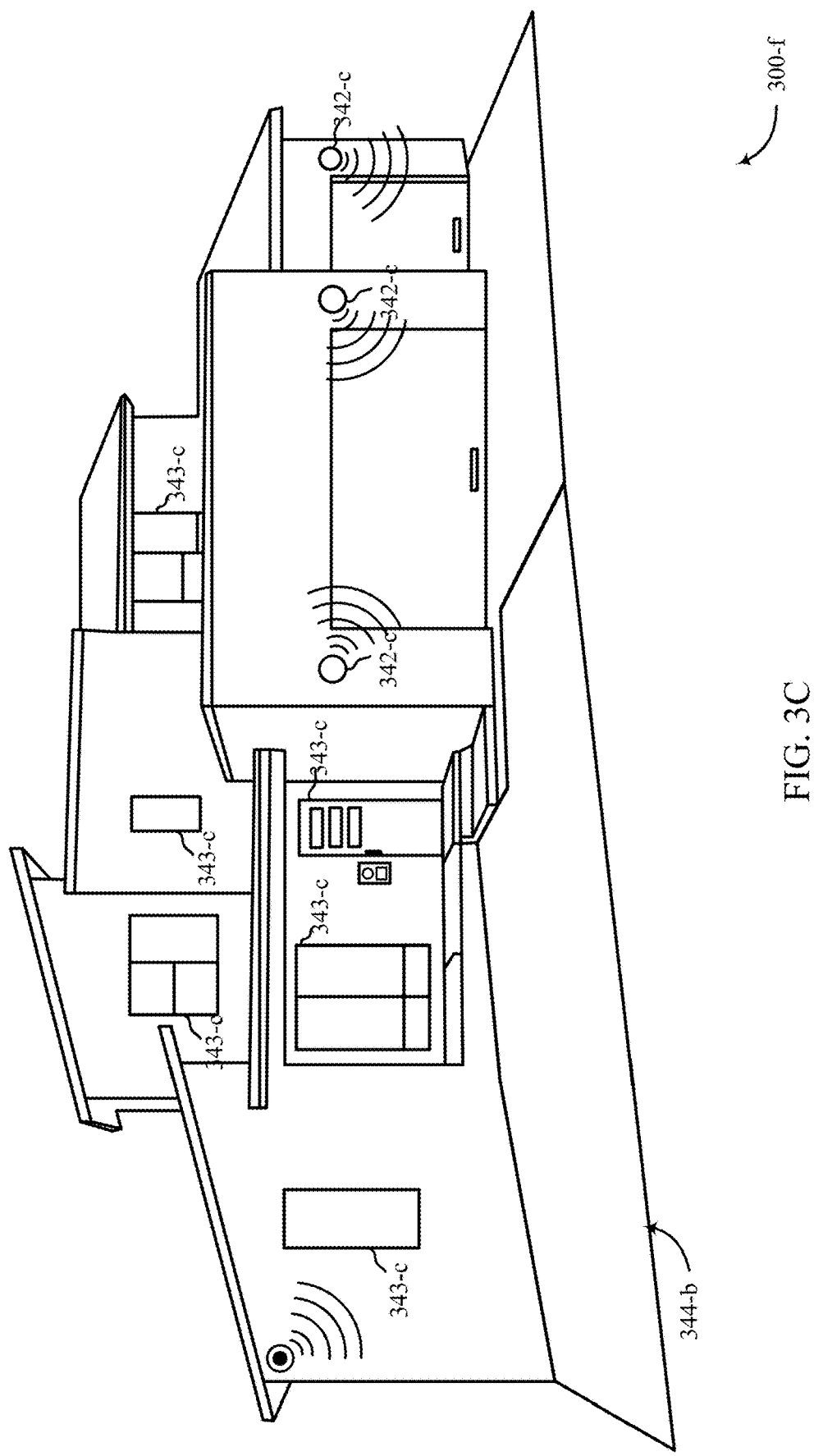
FIG. 3C is a block diagram relating to an example security and automation environment that supports techniques for securing a dropspot in accordance with aspects of the present disclosure.

FIG. 3C illustrates an example diagram relating to an example security and automation environment 341-c that supports techniques for securing a dropspot in accordance with aspects of the present disclosure. In some examples, the security and automation environment 341-c may implement aspects of the system 100. The security and automation environment 341-c may include one or more sensor units 342-c and one or more access points 343-c. For example, the access points 343-c may include windows of a smart home and an entrance door to the smart home. In some examples, an access point of the smart home may include one or more garage doors. The one or more sensor units 342-c may be installed, mounted, or integrated with one or more of the access points 343-c, or alternatively with an interior and/or an exterior surface of the smart home.

In one embodiments, the security and automation environment 341-c may support smart sensing of one or more parameters of the smart home and may determine schedule a service associated with the smart home. For example, the security and automation environment 341-c, may support smart sensing of a lawn 344-b related to the smart home. By providing smart sensing of the lawn 344-b, a controller 135 may predict future conditions of the lawn 344-b. Based on the future condition (i.e., whether the lawn 344-b will be in a satisfactory or unsatisfactory state), the controller 135 may provide suggested solutions to an individual or perform functions automatically to mitigate or eliminate the future condition from occurring.

The controller 135 may be an example of premises automation controller 135 as described with reference to FIG. 1. In one example, the controller 135 may be located within the smart home. The controller 135 may receive data from the one or more sensor units 342-c that may be installed, mounted, or integrated with an exterior surface of the smart home. In some examples, the controller 135 may communicate and receive data periodically or continuously from the sensor units 343-c. The controller 135, the one or more sensor units 343-c may communicate according to a radio access technology (RAT) such as 5G New Radio (NR) RAT, Long Term Evolution (LTE), Institute of Electrical and Electronics Engineers (IEEE) 802.11 (Wi-Fi), IEEE 802.16 (WiMAX), near-filed communication (NFC), ZigBee protocol, among others.

The one or more sensor units 343-c may be same or different sensors configured to conduct continuous or discontinuous measurements of the lawn 344-b. In some cases, to improve the operating characteristics (e.g., power consumption, central processing unit (CPU) usage, memory usage) of the controller 135, the one or more sensor units 342-c may be configured by the controller 135 to transmit data related to the lawn 344-b, periodically. For instance, periodic transmissions may include a sensor unit 342-c transmitting sensor data to the controller 135 every n hours, days, or weeks, where n is a positive integer.

In one example, the controller 135 may store the registration information in a local memory or remotely (e.g., in a remote database such as database 120 as described with reference to FIG. 1). In some cases, the smart home may be associated with a subscription service. A subscription service may, for example, include a security service and the controller 135 may be part of the security service. For example, the controller 135 may communicate received sensor data to a server associated with the security service. Alternatively, the controller 135 may be the property of the individual associated with the smart home. In this case, the individual may install and register an application related to the security service onto the controller 135.

Figure 4:
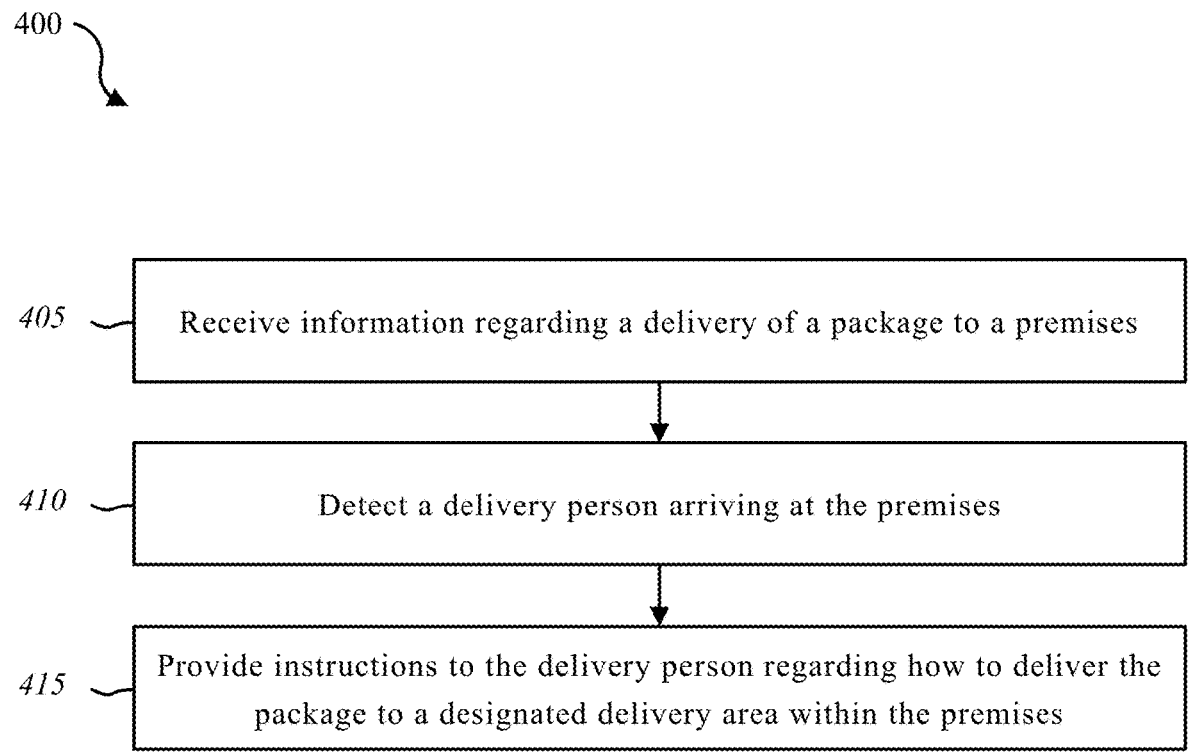
FIG. 4 is a flow diagram illustrating one embodiment of a method for secure package delivery in accordance with aspects of the present disclosure.

FIG. 4 a flow diagram illustrating one embodiment of a method 400 for secure package delivery. In some configurations, the method 500 may be implemented by the secure delivery module 140 illustrated in FIG. 1 or 2. In some configurations, the method 500 may be implemented in conjunction with an application and/or the user interface associated with one or more devices depicted in FIG. 1.

At block 405, information regarding a delivery of a package to a premises may be received. At block 410, a delivery person arriving at the premises may be detected. At block 415, instructions may be provided to the delivery person regarding how to deliver the package to the designated delivery area within the premises. Additionally, or alternatively, instructions may be provided to the delivery person of how to gain access to a specified delivery area of the premises.

Figure 5:
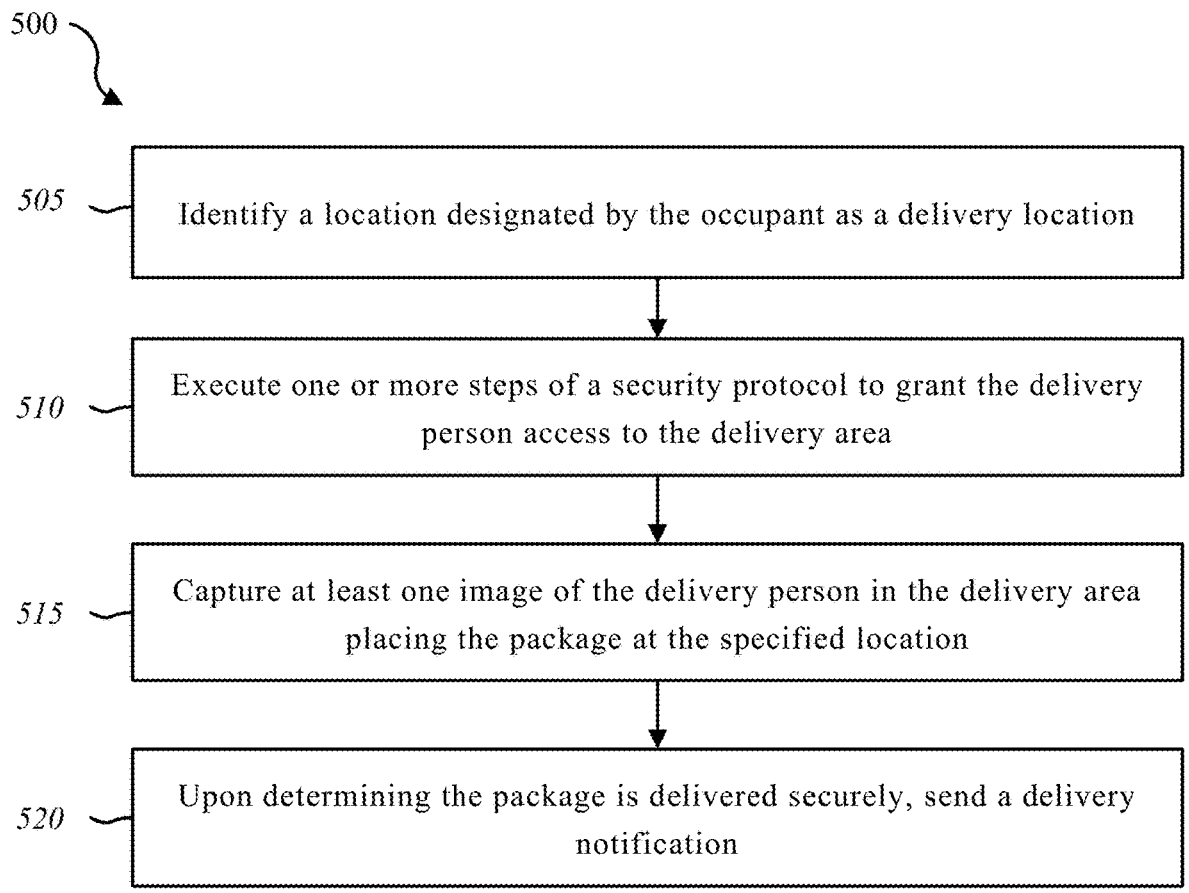
FIG. 5 is a flow diagram illustrating one embodiment of a method for granting a delivery person access to a designated delivery area of a premises in accordance with aspects of the present disclosure.

FIG. 5 is a flow diagram illustrating one embodiment of a method 500 for granting a delivery person access to a designated delivery area of a premises. In some configurations, the method 500 may be implemented by the secure delivery module 140 illustrated in FIG. 1 or 2. In some configurations, the method 500 may be implemented in conjunction with an application and/or the user interface associated with one or more devices depicted in FIG. 1.

At block 505, a location designated by the occupant as a delivery location may be identified. In some embodiments, an occupant of the premises may be requested to select a delivery area and to specify a location within the delivery area where the package is to be placed by the delivery person. In some cases, one or more photo and/or video images of the delivery area may be captured. Image analysis may be performed on the captured image to identify the designated location. For example, a marker placed at the designated location by the occupant may be detected. At block 510, one or more steps of a security protocol may be executed before granting the delivery person access to the delivery area. In some embodiments, the arrival of the delivery person to the premises may be detected. It may be determined whether the delivery person arrives within a predetermined period of time in relation to a specified delivery time. In some cases, upon verifying the identity of the delivery person and/or upon verifying that at least one monitored locking mechanism of the premises is in a locked position, the delivery person may be granted access to the delivery area. In some cases, a temporary access code supplied by the delivery person and/or transmitted by a device associated with the delivery person may be verified. At block 515, at least one image may be captured of the delivery person in the delivery area placing the package at the designated location. At block 520, upon determining the package is delivered securely, a delivery notification may be sent. The delivery notification may include at least one element of information regarding the delivery of the package, an image of the delivered package, and/or a system security overview.

Figure 6:
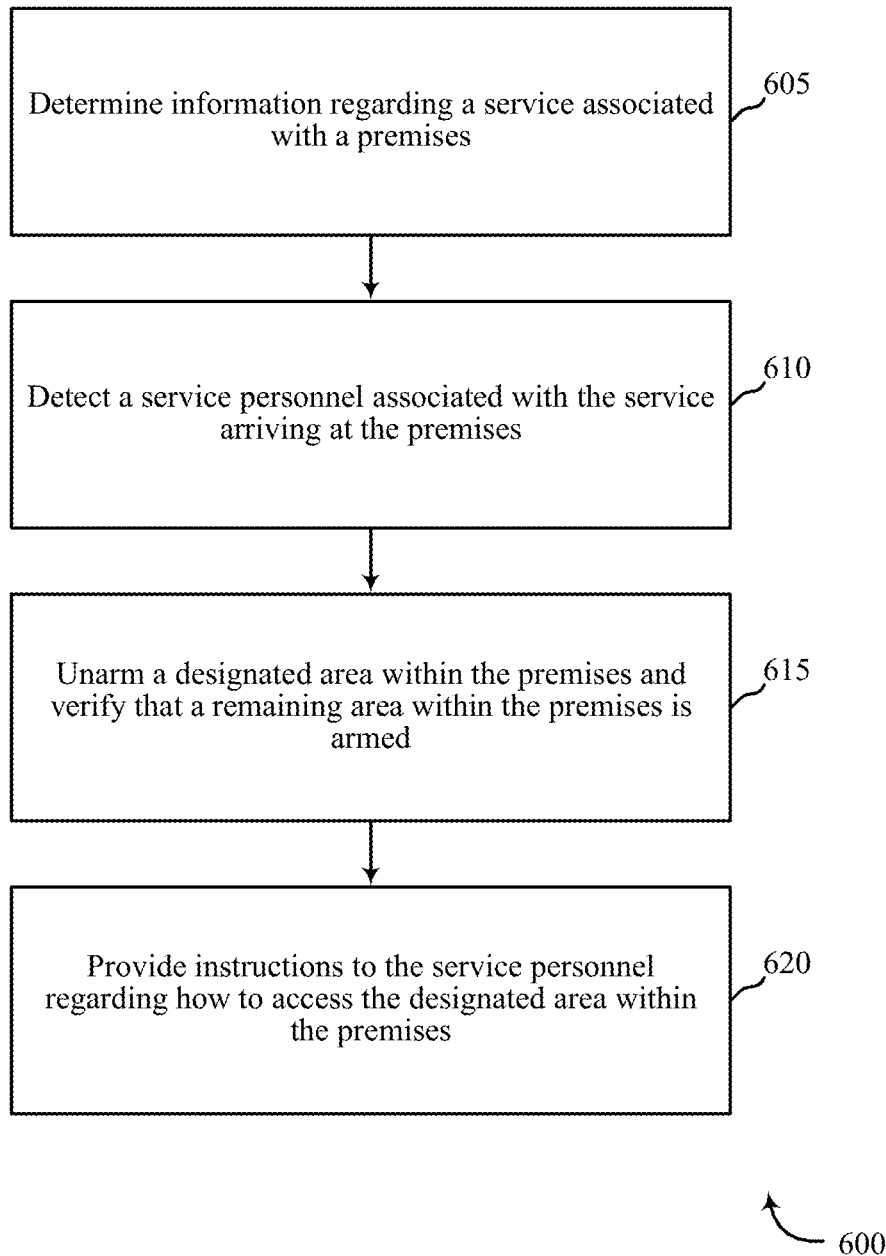
FIG. 6 is a flow diagram illustrating one embodiment of methods for enabling secure access using a security and/or automation system in accordance with aspects of the present disclosure.

FIG. 6 shows a flowchart illustrating a method 600 for enabling secure access using a security and/or automation system in accordance with aspects of the present disclosure. The operations of method 600 may be implemented by a premises automation controller 135 or its components as described herein. For example, the operations of method 600 may be performed by a secure delivery module 140 as described with reference to FIGS. 1 and 2. In some cases, additionally or alternatively, the operations of method 600 may be implemented by a local computing device 105, 130, or a server 110, or its components as described herein. In some examples, a premises automation controller 135 (such as a control panel) may execute a set of codes to control the functional elements of the device to perform the functions described below. Additionally or alternatively, the premises automation controller 135 may perform aspects of the functions described below using special-purpose hardware.

At block 605, information regarding a service associated with a premises is determined. At block 610, a service personnel associated with the service arriving at the premises is detected. At block 615, a designated area within the premises is unarmed and a remaining area within the premises is verified to be armed. At block 620, instructions are provided to the service personnel regarding how to access the designated area within the premises.

Figure 7:
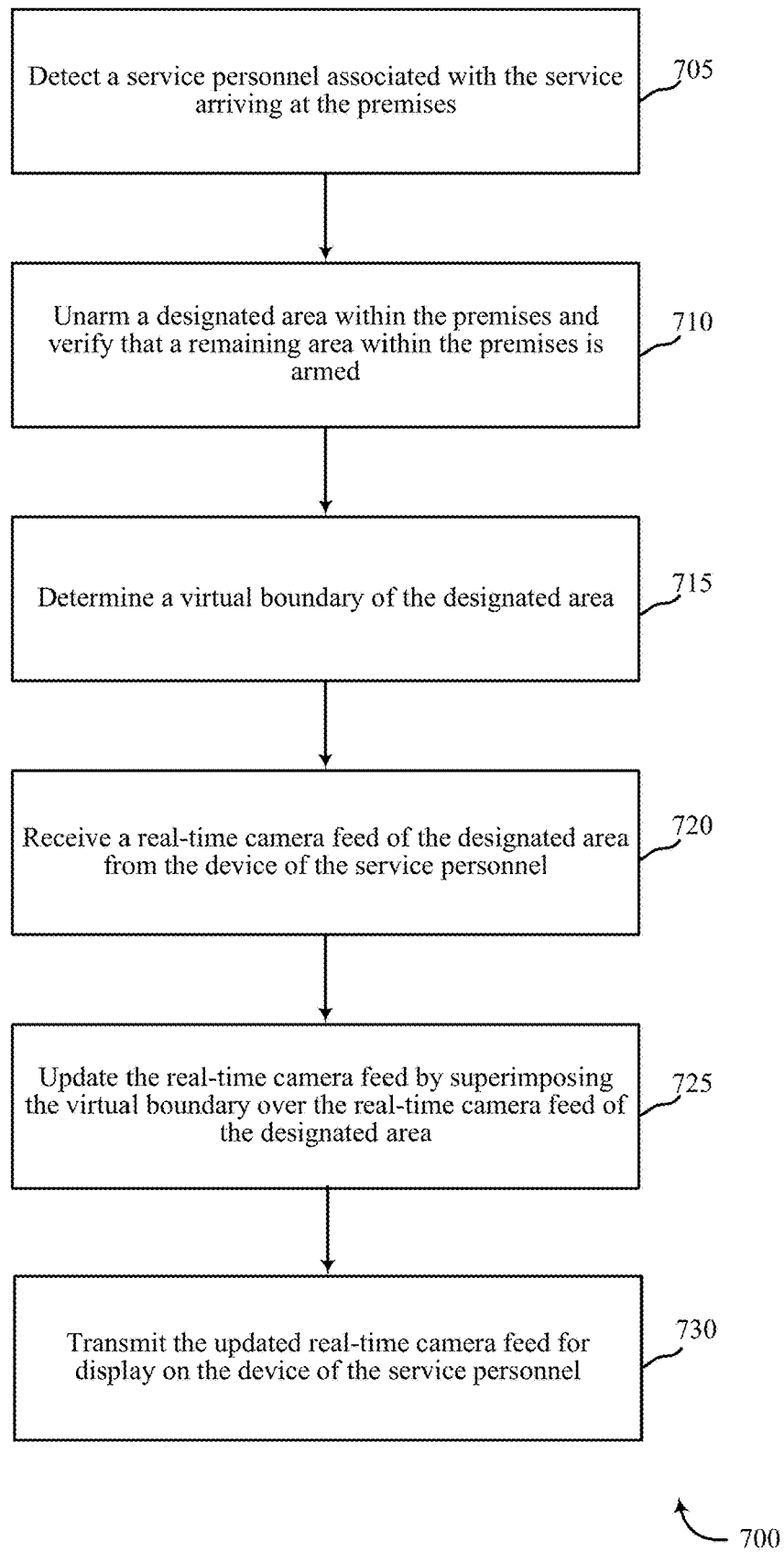
FIG. 7 is a flow diagram illustrating one embodiment of methods for enabling secure access using a security and/or automation system in accordance with aspects of the present disclosure.

FIG. 7 shows a flowchart illustrating a method 700 for enabling secure access using a security and/or automation system in accordance with aspects of the present disclosure. The operations of method 700 may be implemented by a premises automation controller 135 or its components as described herein. For example, the operations of method 700 may be performed by a secure delivery module 140 as described with reference to FIGS. 1 and 2. In some cases, additionally or alternatively, the operations of method 700 may be implemented by a local computing device 105, 130, or a server 110, or its components as described herein. In some examples, a premises automation controller 135 (such as a control panel) may execute a set of codes to control the functional elements of the device to perform the functions described below. Additionally or alternatively, the premises automation controller 135 may perform aspects of the functions described below using special-purpose hardware.

At block 705, a service personnel associated with the service is detected arriving at the premises. At block 710, a designated area within the premises is unarmed and that a remaining area within the premises is verified to be armed. At block 715, a virtual boundary of the designated area is determined. As one example, the virtual boundary may be determined based on the type of service. In some cases, the virtual boundary may be received as an input from a user of the security and/or automation system. At block 720, a real-time camera feed of the designated area is received from the device of the service personnel. At block 725, the real-time camera feed is updated by superimposing the virtual boundary over the real-time camera feed of the designated area. At block 730, the updated real-time camera feed is transmitted for display on the device of the service personnel.

Figure 8:
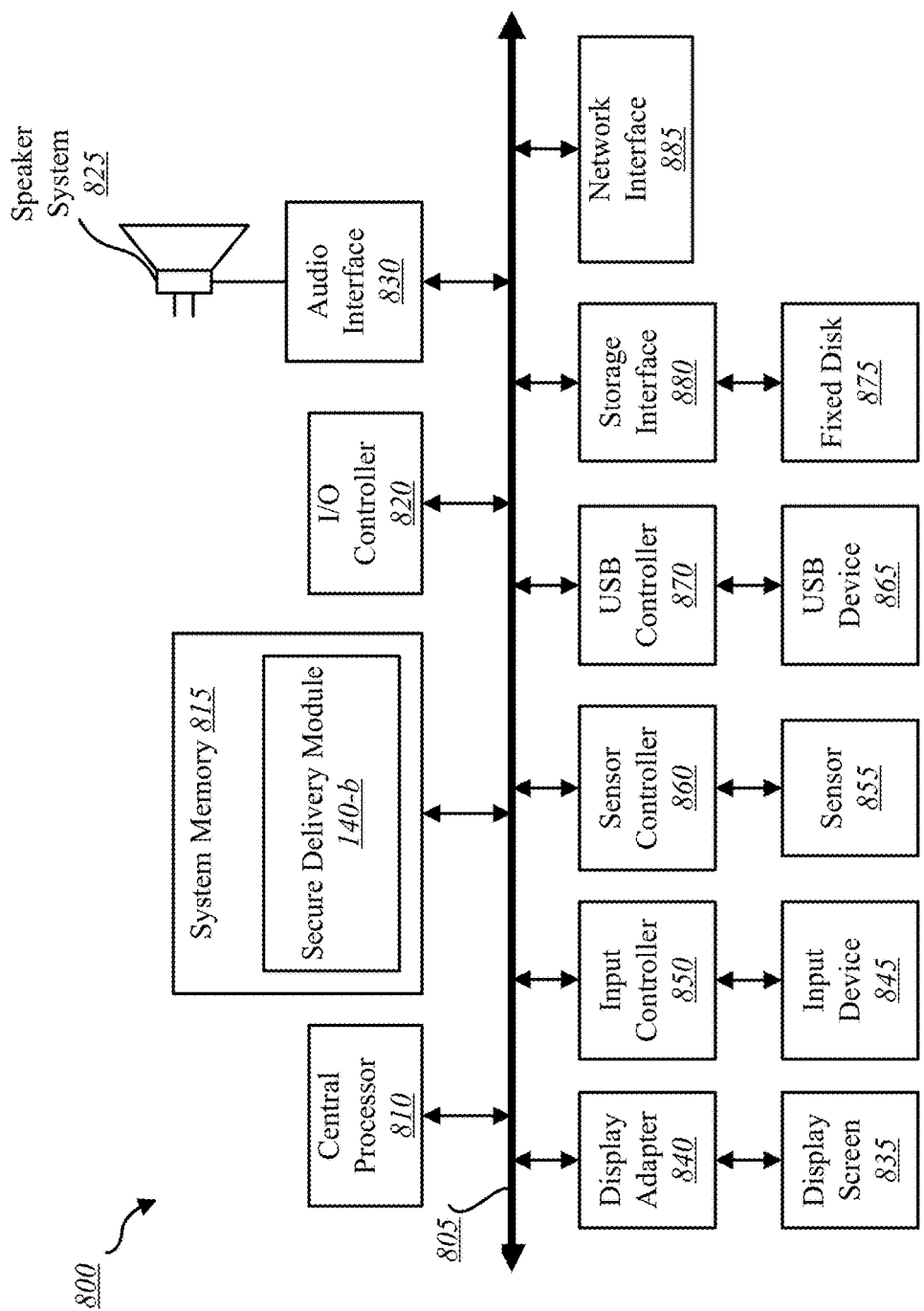
FIG. 8 depicts a block diagram of a computer system suitable for implementing the present systems and methods in accordance with aspects of the present disclosure.

FIG. 8 depicts a block diagram of a controller 800 suitable for implementing the present systems and methods. The controller 800 may be an example of the set top box device 105, computing device 150, and/or premises automation controller 135 illustrated in FIG. 1. In one configuration, controller 800 includes a bus 805 which interconnects major subsystems of controller 800, such as a central processor 810, a system memory 815 (typically RAM, but which may also include ROM, flash RAM, or the like), an input/output controller 820, an external audio device, such as a speaker system 825 via an audio output interface 830, an external device, such as a display screen 835 via display adapter 840, an input device 845 (e.g., remote control device interfaced with an input controller 850), multiple USB devices 865 (interfaced with a USB controller 870), and a storage interface 880. Also included are at least one sensor 855 connected to bus 805 through a sensor controller 860 and a network interface 885 (coupled directly to bus 805). Bus 805 allows data communication between central processor 810 and system memory 815, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the secure delivery module 140-b to implement the present systems and methods may be stored within the system memory 815. Applications resident with controller 800 are generally stored on and accessed via a non-transitory computer readable medium, such as a hard disk drive (e.g., fixed disk 875) or other storage medium. Additionally, applications can be in the form of electronic signals modulated in accordance with the application and data communication technology when accessed via interface 885.

Storage interface 880, as with the other storage interfaces of controller 800, can connect to a standard computer readable medium for storage and/or retrieval of information, such as a fixed disk drive 875. Fixed disk drive 875 may be a part of controller 800 or may be separate and accessed through other interface systems. Network interface 885 may provide a direct connection to a remote server via a direct network link to the Internet via a POP (point of presence). Network interface 885 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 800 wirelessly via network interface 885.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 8 need not be present to practice the present systems and methods. The devices and subsystems can be interconnected in different ways from that shown in FIG. 8. The aspect of some operations of a system such as that shown in FIG. 8 are readily known in the art and are not discussed in detail in this application. Code to implement the present disclosure can be stored in a non-transitory computer-readable medium such as one or more of system memory 815 or fixed disk 875. The operating system provided on controller 800 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for enabling secure access using a security and/or automation system, comprising:
   determining, by a control panel of the security and/or automation system, information regarding a service associated with a premises;
   detecting, by the control panel, a service personnel associated with the service arriving at the premises;
   receiving, by the control panel, an input identifying a virtual boundary of a designated area within the premises;
   determining the virtual boundary of the designated area based at least in part on receiving the input identifying the virtual boundary, wherein a remaining area within the premises is located outside the virtual boundary;
   unarming, by the control panel, the designated area within the premises based at least in part on the input identifying the virtual boundary and verifying that the remaining area within the premises is armed, wherein the designated area within the premises is based at least in part on a type of the service;
   providing, by the control panel, instructions to the service personnel regarding how to access the designated area within the premises; and
   transmitting, for display on a device of the service personnel, the virtual boundary of the designated area, wherein the virtual boundary is superimposed over a real-time camera feed of the designated area.

2. The method of claim 1, wherein determining information regarding the service comprises:
   receiving real-time usage data of a resource associated with the service from a sensor;
   predicting a future change in condition associated with the resource based at least in part on the real-time usage data; and
   automatically scheduling the service personnel to visit the premises and perform an action associated with the service based at least in part on the predicted future change.

3. The method of claim 1, further comprising:
   receiving a real-time camera feed of the designated area from the device of the service personnel;
   updating the real-time camera feed by superimposing the virtual boundary over the real-time camera feed of the designated area, wherein the virtual boundary is superimposed using one or more techniques to generate an augmented reality; and
   transmitting the updated real-time camera feed for display on the device of the service personnel.

4. The method of claim 1, wherein receiving the input identifying the virtual boundary further comprises:
   receiving the input identifying the virtual boundary from a user of the security and/or automation system.

5. The method of claim 4, wherein receiving the input comprises:
   transmitting to the user of the security and/or automation system, an image of the premises and the type of the service; and
   receiving a tactile input identifying the virtual boundary of the designated area on the image of the premises.

6. The method of claim 1, wherein providing the instructions to the service personnel comprises:
   transmitting access information to the service personnel based at least in part on detecting the service personnel, wherein the access information comprises at least one of a random code, a personal identification number (PIN), or other instructions to detect the virtual boundary of the designated area prior to providing the service, or any combination thereof.

7. The method of claim 6, further comprising:
   receiving authentication information associated with the service personnel, wherein the authentication information is based at least in part on the transmitted access information; and
   verifying the authentication information associated with the service personnel, wherein unarming the designated area within the premises is based at least in part on the verifying.

8. The method of claim 1, further comprising:
   tracking real-time usage data of a resource associated with the service;
   retrieving, from a database, historical usage data associated with the service based at least in part on the tracking; and
   identifying an upcoming instance of the service based at least in part on the real-time usage data and the historical usage data, wherein determining information regarding the service is based at least in part on the identifying.

9. The method of claim 8, further comprising:
   identifying a schedule information associated with an occupant of the premises; and
   automatically scheduling the service personnel to visit the premises and perform an action associated with the service based at least in part on the schedule information of the occupant of the premises.

10. The method of claim 8, wherein automatically scheduling the service personnel comprises:
    transmitting, to a device of the service provider, a message indicating a service request, wherein the message comprises at least one of a payment information, a geolocation information of the premises, a contact information of an occupant, or any combination thereof; and
    receiving, from the device, a confirmation message in response to the service request.

11. The method of claim 1, further comprising:
    upon determining a secure completion of the service, sending a completion notification to a user of the security and/or automation system, wherein the completion notification comprises at least one of information regarding the completion of the service, an image of the designated area after completion of the service, or a combination thereof.

12. The method of claim 1, wherein the service is a premises management service or a personal service related to an individual associated with the premises.

13. The method of claim 12, wherein the premises management service comprises at least one of a gardening and lawn care service, an internet-provider service, a housekeeping service, a laundry service, a plumbing service, a maintenance service, a termite and pest control service, a water softener service, or any combination thereof.

14. The method of claim 12, wherein the personal service comprises at least one of a delivery service, a babysitting service, a nursing care service, a pet sitting service, a medical provider visit service, or any combination thereof.

15. An apparatus for security and/or automation systems, comprising:
a processor;
memory in electronic communication with the processor; and
instructions stored in the memory, the instructions being executable by the processor to:
determine, by a control panel of a security and/or automation system, information regarding a service associated with a premises;
detect, by the control panel, a service personnel associated with the service arriving at the premises;
receive, by the control panel, an input identifying a virtual boundary of a designated area within the premises;
determine the virtual boundary of the designated area based at least in part on receiving the input identifying the virtual boundary, wherein a remaining area within the premises is located outside the virtual boundary;
unarm, by the control panel, the designated area within the premises based at least in part on the input identifying the virtual boundary and verifying that the remaining area within the premises is armed, wherein the designated area within the premises is based at least in part on a type of the service;
provide, by the control panel, instructions to the service personnel regarding how to access the designated area within the premises; and
transmit, for display on a device of the service personnel, the virtual boundary of the designated area, wherein the virtual boundary is superimposed over a real-time camera feed of the designated area.

16. The apparatus of claim 15, wherein the instructions are further executable by the processor to:
receive real-time usage data of a resource associated with the service from a sensor;
predict a future change in condition associated with the resource based at least in part on the real-time usage data; and
automatically schedule the service personnel to visit the premises and perform an action associated with the service based at least in part on the predicted future change.

17. The apparatus of claim 15, wherein the instructions are further executable by the processor to:
receive a real-time camera feed of the designated area from the device of the service personnel;
update the real-time camera feed by superimposing the virtual boundary over the real-time camera feed of the designated area, wherein the virtual boundary is superimposed using one or more techniques to generate an augmented reality; and
transmit the updated real-time camera feed for display on the device of the service personnel.

18. A non-transitory computer-readable medium storing computer-executable code thereon, the code executable by a processor to perform steps comprising:
determine, by a control panel of a security and/or automation system, information regarding a service associated with a premises;
detect, by the control panel, a service personnel associated with the service arriving at the premises;
receive, by the control panel, an input identifying a virtual boundary of a designated area within the premises;
determine the virtual boundary of the designated area based at least in part on receiving the input identifying the virtual boundary, wherein a remaining area within the premises is located outside the virtual boundary;
unarm, by the control panel, the designated area within the premises based at least in part on the input identifying the virtual boundary and verifying that the remaining area within the premises is armed, wherein the designated area within the premises is based at least in part on a type of the service;
provide, by the control panel, instructions to the service personnel regarding how to access the designated area within the premises; and
transmit, for display on a device of the service personnel, the virtual boundary of the designated area, wherein the virtual boundary is superimposed over a real-time camera feed of the designated area.

\* \* \* \* \*